United States Patent
Son et al.

(10) Patent No.: US 11,222,263 B2
(45) Date of Patent: *Jan. 11, 2022

(54) NEURAL NETWORK METHOD AND APPARATUS

(71) Applicant: Samsung Electronics Co., Ltd., Suwon-si (KR)

(72) Inventors: Changyong Son, Anyang-si (KR); Jinwoo Son, Seoul (KR); Byungin Yoo, Seoul (KR); Chang Kyu Choi, Seongnam-si (KR); Jae-Joon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 953 days.

This patent is subject to a terminal disclaimer.

(21) Appl. No.: 15/630,610

(22) Filed: Jun. 22, 2017

(65) Prior Publication Data

US 2018/0032866 A1 Feb. 1, 2018

(30) Foreign Application Priority Data

Jul. 28, 2016 (KR) .................. 10-2016-0096173
Feb. 14, 2017 (KR) .................. 10-2017-0020034

(51) Int. Cl.
*G06N 3/08* (2006.01)
*G06N 3/063* (2006.01)
(Continued)

(52) U.S. Cl.
CPC .............. *G06N 3/08* (2013.01); *G06F 5/01* (2013.01); *G06F 7/523* (2013.01); *G06N 3/04* (2013.01); *G06N 3/063* (2013.01); *G06N 3/082* (2013.01)

(58) Field of Classification Search
CPC ............ G06N 3/08; G06N 3/04; G06N 3/063; G06N 3/082; G06F 5/01; G06F 7/523
See application file for complete search history.

(56) References Cited

U.S. PATENT DOCUMENTS 5,497,430 A * 3/1996 Sadovnik ........... G06K 9/00221
382/118
6,269,351 B1 * 7/2001 Black ................. G06F 16/30
706/15
(Continued)

FOREIGN PATENT DOCUMENTS

KR 10-0828411 B1 5/2008
KR 10-2008-0067793 A 7/2008
(Continued)

OTHER PUBLICATIONS

Habib, Ibrahim, A. Tarraf, and T. Saadawi. "A neural network controller for congestion control in ATM multiplexers." Computer networks and ISDN systems 29.3 (1997): 325-334. (Year: 1997).*
(Continued)

*Primary Examiner* — Alexey Shmatov
*Assistant Examiner* — Ahsif A. Sheikh
(74) *Attorney, Agent, or Firm* — NSIP Law

(57) ABSTRACT

A lightened neural network method and apparatus. The neural network apparatus includes a processor configured to generate a neural network with a plurality of layers including plural nodes by applying lightened weighted connections between neighboring nodes in neighboring layers of the neural network to interpret input data applied to the neural network, wherein lightened weighted connections of at least one of the plurality of layers includes weighted connections that have values equal to zero for respective non-zero values whose absolute values are less than an absolute value of a non-zero value. The lightened weighted connections also include weighted connections that have
(Continued)

values whose absolute values are no greater than an absolute value of another non-zero value, the lightened weighted connections being lightened weighted connections of trained final weighted connections of a trained neural network whose absolute maximum values are greater than the absolute value of the other non-zero value.

37 Claims, 21 Drawing Sheets

(51) Int. Cl.
*G06F 5/01* (2006.01)
*G06F 7/523* (2006.01)
*G06N 3/04* (2006.01)

(56) References Cited

U.S. PATENT DOCUMENTS

| | | | |
|---|---|---|---|
| 7,469,237 B2 | 12/2008 | Cooper | |
| 8,694,451 B2 | 4/2014 | Sasagawa | |
| 9,047,566 B2 | 6/2015 | Golovashkin et al. | |
| 9,323,498 B2 | 4/2016 | Kim | |
| 2007/0033419 A1* | 2/2007 | Kocher | G06F 9/445 713/193 |
| 2013/0138589 A1* | 5/2013 | Yu | G06N 3/08 706/25 |
| 2015/0199963 A1* | 7/2015 | Maaninen | G10L 15/16 704/232 |
| 2015/0206048 A1 | 7/2015 | Talathi et al. | |
| 2015/0331832 A1 | 11/2015 | Minoya et al. | |
| 2016/0034788 A1 | 2/2016 | Lin et al. | |
| 2016/0174902 A1* | 6/2016 | Georgescu | G06T 7/0012 600/408 |
| 2016/0328646 A1* | 11/2016 | Lin | G06K 9/4628 |
| 2017/0286830 A1* | 10/2017 | El-Yaniv | G06N 3/0481 |
| 2018/0144242 A1* | 5/2018 | Simard | G06N 3/0454 |

FOREIGN PATENT DOCUMENTS

| | | |
|---|---|---|
| KR | 10-0859246 B1 | 9/2008 |
| KR | 10-1568590 B1 | 11/2015 |

OTHER PUBLICATIONS

Miyashita, Daisuke et al. "Convolutional Neural Networks using Logarithmic Data Representation." ArXiv abs/1603.01025 (2016): n. pag. (Year: 2016).*

Han, Song et al. "Deep Compression: Compressing Deep Neural Network with Pruning, Trained Quantization and Huffman Coding." CoRR abs/1510.00149 (2015): n. pag. (Year: 2015).*

Courbariaux, Matthieu, et al., "Training Deep Neural Networks with Low Precision Multiplications." *arXiv preprint arXiv*:1412.7024, 2014, (10 pages in English).

Anwar, Sajidetal et al., "Fixed Point Optimization of Deep Convolutional Neural Networks for Object Recognition." *2015 IEEE International Conference on Acoustics, Speech and Signal Processing (ICASSP)*, 2015 (6 pages in English).

Han, Song, et al., "Deep Compression: Compressing Deep Neural Networks with Pruning, Trained Quantization and Huffman Coding." *arXiv preprint arXiv*:1510.00149, 2015 (14 pages in English).

Extended European Search Report dated Feb. 5, 2018 in corresponding European Patent Application No. 17182605.0 (11 pages in English).

* cited by examiner

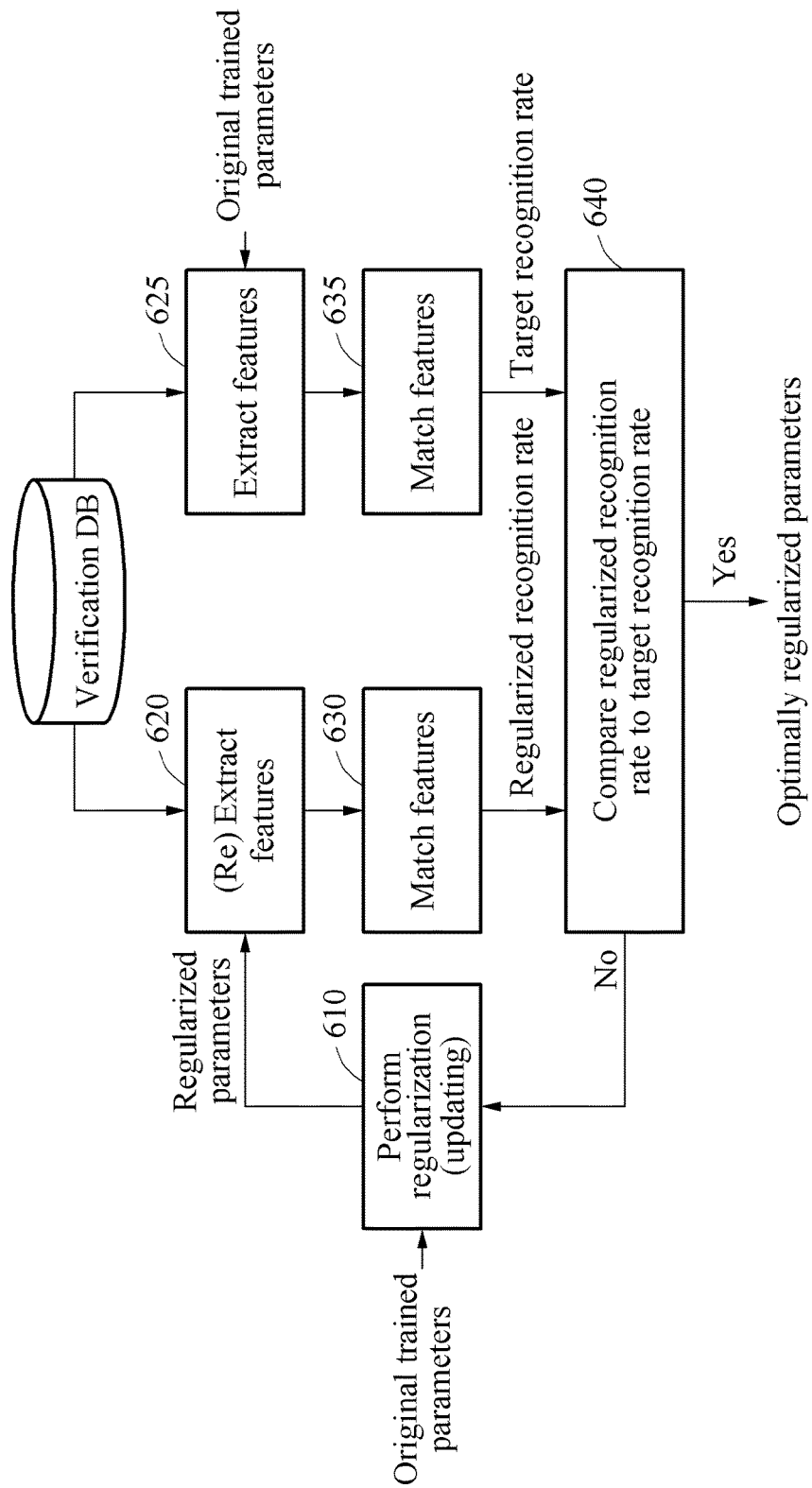

NEURAL NETWORK METHOD AND APPARATUS

CROSS-REFERENCE TO RELATED APPLICATION(S)

This application claims the benefit under 35 USC § 119(a) of Korean Patent Application No. 10-2016-0096173, filed on Jul. 28, 2016, and Korean Patent Application No. 10-2017-0020034 filed on Feb. 14, 2017, in the Korean Intellectual Property Office, the entire disclosures of which are incorporated herein by reference for all purposes.

BACKGROUND

1. Field

The following description relates to a neural network method and apparatus, including a method and apparatus that trains and/or lightens a trained neural network, as well as a method and apparatus that performs recognition based on the same.

2. Description of Related Art

Object recognition may include a method of recognizing a predetermined object included in input data. The object may be a variety of data, for example, video, image, or audio, that is to be recognized based on a predetermined pattern. For example, an image-based object classifier may automatically search for a predetermined object included in an input image. Such an object classifier may be implemented through a trained object classifier model that includes a plurality of nodes and weighted connections that connect the nodes, with the weighted connections being trained through an iterative process based on training data, e.g., labeled training data. However, the amount of memory and processing resources that are required to perform such recognition using the trained object classifier model, as well as the memory and resources necessary for training an example object classifier model, may rapidly increase as the number of nodes and number of weighted connection between the nodes increases in the object classifier model. Overfitting may also occur due to unintentional biasing or excessive training of the object classifier model.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

In one general aspect, a neural network apparatus includes a processor configured to generate a neural network with a plurality of layers including plural nodes by applying lightened weighted connections between neighboring nodes in neighboring layers of the neural network to interpret input data applied to the neural network, wherein lightened weighted connections of at least one of the plurality of layers includes weighted connections that have values equal to zero for respective non-zero values whose absolute values are less than an absolute value of a first non-zero value.

The lightened weighted connections of the at least one layer may be lightened weighted connections resulting from a lightening of trained final weighted connections of a corresponding at least one layer, of a trained neural network, that include weighted connections that have at least some non-zero values for respective values less than a positive variant of the first non-zero value and/or for respective values greater than a negative variant of the first non-zero value, the generated neural network representing a lightened neural network corresponding to the trained neural network trained for the interpreting of input data.

The processor may be further configured to obtain the trained final weighted connections and generate the neural network with the lightened weighted connections by performing the lightening of the obtained trained final weighted connections of the corresponding at least one layer by setting to zero at least some of the trained final weighted connections, of the corresponding at least one layer, whose values are less than a positive variant of the first non-zero value and/or greater than a negative variant of the first non-zero value.

The processor may be further configured to acquire regularized parameters, as the lightened weighted connections of the at least one layer, perform a deregularization of the regularized parameters based on a determined regularization variable, as the first non-zero value, corresponding to the at least one layer of the neural network, generate the neural network by applying the deregularized parameters to generate the at least one layer of the neural network, and perform a recognition operation of input data by applying the input data to the generated neural network.

The trained final weighted connections may have values in a 32-bit floating-point representation format and the lightened weighted connections may have values in a 16-bit fixed-point representation format.

The lightened weighted connections of the at least one layer, or other lightened weighted connections of the at least one layer, may include weighted connections that have values whose absolute values are not greater than an absolute value of an absolute value of a different second non-zero value.

The different non-zero value may be different between at least two of the plurality of layers having lightened weighted connections.

The different non-zero value may be different between at least two output map channels for a convolutional layer of the generated neural network having the lightened weighted connections.

The lightened weighted connection may have values that are respectively represented by a number of bits corresponding to log 2(b–a) in which b denotes an integer absolute value of the different non-zero value and a corresponds to an integer absolute value of the first non-zero value.

The first non-zero value may be different between at least two of the plurality of layers having lightened weighted connections.

The first non-zero value may be different between at least two output map channels for a convolutional layer of the generated neural network having the lightened weighted connections.

The lightened weighted connections may have values respectively represented by a number of bits corresponding to log 2(max–a) in which max denotes a maximum non-zero positive integer value of the lightened weighted connections and a denotes an integer absolute value of the first non-zero value.

In one general aspect, a neural network lightening apparatus includes a processor configured to generate a neural network, with a plurality of layers including plural nodes, from a trained neural network having trained final weighted connections between neighboring nodes in neighboring layers of the trained neural network trained to interpret input data applied to the trained neural network, the generating of the neural network including lightening the trained final weighted connections by removing or setting to zero at least some trained final weighted connections, of at least one layer of the trained neural network, whose non-zero weighted connection values have absolute values that are less than an absolute value of a non-zero variable a.

The processor may be configured to control the variable a to be different between at least two of the plurality of layers of the generated neural network.

The processor may be configured to control the variable a to be different between at least two output map channels for a convolutional layer of the generated neural network.

The processor may be configured to control lightened weighted connections of the generated neural network to have values respectively represented by a number of bits corresponding to log 2(max–a) in which max denotes a maximum absolute value non-zero integer value of the lightened weighted connections.

The processor may be configured to further control lightening of the at least some trained final weighted connections of the at least one layer of the trained neural network, or control lightening of other trained final weighted connections for the at least one layer of the trained neural network, by limiting an absolute value of lightened weighted connection values to an absolute value of a non-zero variable b.

In the controlling of the lightening of the at least some trained final weighted connections or the controlling of the lightening of the other trained final weighted connections, the variable b may be controlled to be different between at least two the plurality of layers of the generated neural network.

In the controlling of the lightening of the at least some trained final weighted connections or the controlling of the lightening of the other trained final weighted connections, the variable b may be controlled to be different between at least two output map channels in a convolutional layer of the generated neural network.

The processor may be configured to control lightened weighted connections of the generated neural network to have values respectively represented by a number of bits corresponding to log 2(b–a).

In one general aspect, a neural network lightening apparatus includes a processor configured to generate, from a trained neural network having trained final weighted connections between neighboring nodes in neighboring layers of the trained neural network trained to interpret input data applied to the trained neural network, lightened weighted connections for a different neural network with a plurality of layers including plural nodes, the generating of the lightened weighted connections including lightening the trained final weighted connections by performing a regularization of the trained final weighted connections.

The processor may be further configured to generate the different neural network with the lightened weighted connections and perform a recognition operation of a captured image by applying the captured image to the generated different neural network.

The generating of the lightened weighted connections may include converting floating point values of the trained final weighted connections to fixed point values.

The regularization may include removing or setting to zero at least some trained final weighted connections of at least one layer of the trained neural network whose weighted connection values have absolute values that are less than an absolute value of a non-zero variable a, and shifting values of the lightened trained final weighted connections from a positive variant of the variable a toward zero and/or a negative variant of the variable a toward zero, as the lightened weighted connections of the different neural network.

The processor may be further configured to transmit the lightened weighted connections with the shifted values to a recognition apparatus configured to reverse-shift the transmitted lightened weighted connections with the shifted values away from zero to generate the different neural network with the reverse shifted transmitted lightened weighted connections.

The processor may be further configured to compress the lightened weighted connections.

The processor may be further configured to perform training to generate the trained neural network by generating the trained final weighted connections of the trained neural network by repeatedly applying labeled input training data to neural network variants with respectively adjusted weighted connections to perform interpretation of the input training data until the trained neural network is determined, the adjusting of the weighted connections including another different regularization during the training to generate the trained neural network.

The other different regularization may include Gaussian or Laplace regularization.

The training to generate the trained neural network may further include nodes of the neural network variants applying an activation function that limits absolute values of node output values of the neural network variants to a value that is greater than an absolute value of a non-zero variable b, and the regularization of the trained final weighted connection may include applying a cut-off of positive weighted connection values according to a positive variant of the variable b and/or apply a cut-off of negative weighted connection values according to a negative variant of the variable b.

In a general aspect, a neural network apparatus includes a processor configured to generate a neural network with a plurality of layers including plural nodes by applying lightened weighted connections between neighboring nodes in neighboring layers of the neural network to interpret input data applied to the neural network, wherein lightened weighted connections of at least one of the plurality of layers includes weighted connections that have values whose absolute values are no greater than an absolute value of a first non-zero value, and wherein the lightened weighted connections are lightened weighted connections of trained final weighted connections, of a trained neural network trained for the interpreting of the input data, that have values whose maximum absolute value is greater than the absolute value of the first non-zero value.

The processor may be further configured to obtain the trained final weighted connections and generate the neural network with the lightened weighted connections by performing lightening of the obtained trained final weighted connections by setting at least some of the trained final weighted connections whose values are greater than a positive variant of the first non-zero value to the positive variant of the first non-zero value and/or by setting at least some other of the trained final weighted connections whose values are less than a negative variant of the first non-zero value to the negative variant of the first non-zero value.

The processor may be further configured to perform training to generate the trained neural network by generating the trained final weighted connections of the trained neural network by repeatedly applying labeled input training data to neural network variants with respectively adjusted weighted connections to perform interpretation of the input training data until the trained neural network is determined, with the training to generate the trained neural network including nodes of the neural network variants applying an activation function that limits positive and negative node output values to the maximum absolute value.

The first non-zero value may be different between at least two of the plurality of layers of the generated neural network having lightened weighted connections.

The first non-zero value may be different between at least two output map channels for a convolutional layer of the generated neural network having lightened weighted connections.

The lightened weighted connections may have values respectively represented by a number of bits corresponding to log 2(b−a) in which b denotes an integer absolute value of the first non-zero value and a denotes to an integer absolute value of a different non-zero value corresponding to a truncation of weighted connection values in the lightened weighted connections.

In a general aspect, a processor implemented recognition method includes acquiring regularized parameters corresponding to at least one layer of a neural network, the regularized parameters being regularized parameters derived from trained final parameters of another neural network and including at least some different parameter values from the trained final parameters of the other neural network, performing a deregularizing of the regularized parameters based on a determined regularization variable corresponding to the at least one layer of the neural network, generating the neural network by applying the deregularized parameters to generate the at least one layer of the neural network, and performing a recognition operation of input data by applying the input data to the generated neural network.

The method may further include acquiring the trained final parameters of the other neural network, wherein the generating of the neural network may include generating at least one other layer of the neural network using at least some of the acquired trained final parameters.

The method may further include performing another deregularizing of the regularized parameters based on a determined different regularization variable corresponding to another at least one layer of the neural network or corresponding to an output map channel of a layer of the at least one layer of the neural network that is different from the determined regularization variable that corresponds to another output map channel of the layer of the at least one layer of the neural network.

The regularization variable may include an offset representing a shift in the regularized parameters based on a value of zero.

The generating of the neural network may include, in response to the deregularized parameters being determined to correspond to m-bit integers and the input data being n-bit real numbers and with n being greater than m, dequantizing the deregularized parameters to the n-bit real numbers and generating the neural network by applying the dequantized parameters to generate the at least one layer of the neural network.

The generating of the neural network may include determining whether the acquired regularized parameters are compressed regularized parameters, and in response to the determination indicating that the acquired regularized parameters are compressed regularized parameters acquiring a bit sequence indicating which parameters corresponding to the at least one layer were removed during compression for the compressed regularized parameters, decompressing the deregularized parameters based on the bit sequence, and applying the decompressed deregularized parameters to generate the at least one layer.

The decompressing of the deregularized parameters may include determining a decompressed parameter of a first index in the bit sequence by multiplying a bit value of the first index and a parameter of a second index in a sequence of the deregularized parameters, increasing the second index by the bit value of the first index, and increasing the first index by "1."

In a general aspect, provided is a non-transitory computer-readable storage medium storing instructions, which when executed by a processor, cause the processor to perform one or more or all operations described herein.

In a general aspect, a recognition apparatus including a processor configured to acquire regularized parameters corresponding to at least one layer of a neural network, perform a deregularization of the regularized parameters based on a determined regularization variable corresponding to the at least one layer of the neural network, generate the neural network by applying the deregularized parameters to generate the at least one layer of the neural network, and perform a recognition operation of input data by applying the input data to the generated neural network, wherein the regularized parameters are regularized parameters derived from trained final parameters of another neural network and include at least some different parameter values from the trained final parameters of the other neural network.

The apparatus may further include a camera configured to capture an image as the input data.

The processor may be further configured to acquire the trained final parameters of the other neural network, and, to generate the neural network, the processor may be further configured to generate at least one other layer of the neural network using the acquired trained final parameters.

The apparatus may further include a memory, the memory storing the trained final parameters, wherein the processor may be further configured to apply the trained final parameters to generate the other neural network, and to apply the deregularized parameters to at least one layer of the generated other neural network to generate the neural network.

The processor may be further configured to perform another deregularizing of the regularized parameters based on a determined different regularization variable corresponding to another at least one layer of the neural network or corresponding to an output map channel of a layer of the at least one layer of the neural network that is different from the determined regularization variable that corresponds to another output map channel of the layer of the at least one layer of the neural network.

The regularization variable may include an offset representing a shift in the regularized parameters based on a value of zero.

The generating of the neural network by the processor may include, in response to the deregularized parameters being determined to correspond to m-bit integers and the input data being n-bit real numbers and with n being greater than m, dequantizing the deregularized parameters to the n-bit real numbers and generating the neural network by applying the dequantized parameters to generate the at least one layer of the neural network.

The processor may be further configured to determine whether the acquired regularized parameters are compressed regularized parameters, and in response to the determination indicating that the acquired regularized parameters are compressed regularized parameters acquiring a bit sequence indicating which parameters corresponding to the at least one layer were removed during compression for the compressed regularized parameters, decompressing the deregularized parameters based on the bit sequence, and applying the decompressed deregularized parameters to generate the at least one layer.

The processor may be further configured to determine a decompressed parameter of a first index in the bit sequence by multiplying a bit value of the first index and a parameter of a second index in a sequence of the deregularized parameters, increase the second index by the bit value of the first index, and increase the first index by "1," to decompress the deregularized parameters.

In a general aspect, a neural network apparatus includes a processor configured to generate a neural network with a plurality of layers each including plural nodes, and to apply lightened weighted connections between neighboring nodes in neighboring layers of the neural network to interpret input data applied to the neural network, wherein lightened weighted connections of at least one of the plurality of layers includes weighted connections that are regularized according to a first regularization to have values equal to zero for respective non-zero values whose absolute values are less than an absolute value of a first non-zero value, and wherein, to generate the neural network, the processor is configured to perform training by repeatedly applying labeled input training data to neural network variants with respectively adjusted lightened weighted connections, lightened according to the first regularization, to perform interpretation of the input training data until the neural network is generated, the adjusting of the lightened weighted connections including second different regularization during the training to generate the trained neural network.

The second different regularization may include Gaussian or Laplace regularization.

The first regularization may further include controlling the weighted connections to be regularized to have values whose absolute values are no greater than an absolute value of a second non-zero value, and the training may include nodes of the neural network variants applying an activation function that limits positive and negative node output values to a maximum absolute value that is greater than an absolute value of the second non-zero value.

Other features and aspects will be apparent from the following detailed description, the drawings, and the claims.

BRIEF DESCRIPTION OF THE DRAWINGS

FIG. 6 is a flowchart illustrating an example of an iterative regularization process.

Figure 1:
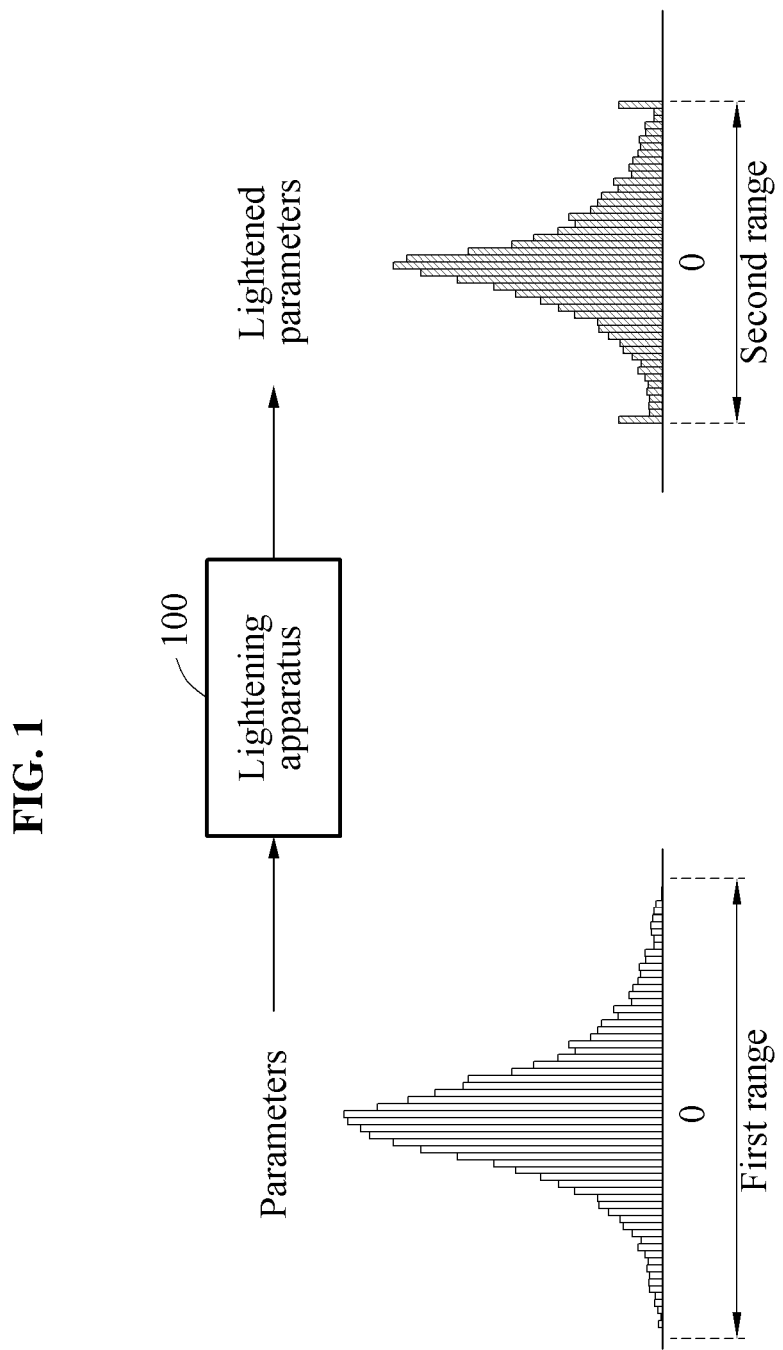
FIG. 1 illustrates an example of an operation of a lightening apparatus according to one or more embodiments.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. The sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Various alterations and modifications may be made to the examples. Here, the examples are not construed as limited to the disclosure and should be understood to include all changes, equivalents, and replacements within the idea and the technical scope of the disclosure.

Although terms of "first" or "second" may be used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

As used herein, singular forms are intended to include plural forms as well, unless the context clearly indicates otherwise. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, operations, elements, components or a combination thereof, but do not preclude the presence or addition of one or more other features, integers, operations, elements, components, and/or groups thereof.

Unless otherwise defined herein, all terms used herein including technical or scientific terms have the same meanings as those generally understood by one of ordinary skill in the art to which this disclosure pertains consistent with and after an understanding of the present disclosure. Terms defined in dictionaries generally used should be construed to have meanings matching with contextual meanings in the related art and the present disclosure and are not to be construed as an ideal or excessively formal meaning unless otherwise defined herein.

Hereinafter, examples will be described in detail below with reference to the accompanying drawings, and like reference numerals refer to the like elements throughout and a repeated description related thereto may be omitted.

FIG. 1 illustrates an example of an apparatus 100 that lightens a neural network. In the present disclosure, an apparatus that lightens a neural network is referred to as a "lightening apparatus," though embodiments are not limited to such apparatuses only performing such lightening operations, but rather embodiments include such apparatuses also being configured to train the neural network as described below, as well as or alternatively also use the trained neural network or the lightened neural network in an example recognition, classification, or other operation. Referring to FIG. 1, the lightening apparatus 100 acquires parameters corresponding to a layer included in a neural network. For example, the lightening apparatus 100 may acquire parameters, e.g., as determined by the lightening apparatus 100 during the training of the neural network by the lightening apparatus 100, from memory, or through external request. Additionally, the lightening apparatus 100 may acquire parameters from provided connection weight vectors, matrix or matrices, or other format connection weights, representing some or all of the trained weighted connections of the trained neural network. The lightening apparatus 100 may be provided the connection weight vectors, matrix or matrices, or other format connection weights, as a result of training of the neural network by another processing apparatus or server, for example. The lightening apparatus is representative of one or more processors and one or more non-transitory memories, for example, such as to store such parameters, for use during and after the lightening of the neural network, and for storing of instructions, which when executed by the one or more processors, cause the one or more processors to implement one or more or all operations described herein, for example.

The neural network includes a plurality of layers, and each of the layers includes a plurality of nodes. For example, there may be an input layer, at least one hidden layer, and an output layer. Depending on the architecture of the neural network, nodes included in neighboring layers may be selectively connected according to respective connection weights. For example, the neural network may be implemented by a processor, i.e., one or more processors, configured to generate a neural network structure/architecture with such a plurality of layers each including plural nodes and configured to apply such weighted connections between neighboring nodes in neighboring layers of the neural network structure to interpret input data applied to the neural network structure. As only examples, herein such an 'interpretation' of input data may include a performed recognition or rejection, such as language/acoustic or image recognition, translation or rejection, or input data binary or multi-class classification, clustering, pattern observation, transformation, and/or regression, as well as any other trained objective of the neural network. In varying embodiments, the neural network may be trained for acoustic and/or language recognition and/or translation, image recognition, identification, rejection, or discrimination, or battery characteristic monitoring or projection, as only non-limiting examples. Thus, based on the training data and desired interpretation objective, the architecture, selective connection between neighboring nodes, and corresponding connection weights may be varied during training until the neural network is trained to a desired acceptability for the desired interpretation objective. The resultant connection weights of the trained neuro network may be referred to as parameters of the neural network. For example, the neural network may be trained based on the labeled input image information or desired corresponding output images, classifications, or geometric parameters, such as through a backpropagation or simulated annealing algorithms. In the training, connection weightings between nodes of different hidden layers are recursively adjusted until the corresponding neural network model is trained with a desired accuracy rate or below a maximum error rate, for example. The respectively trained neuro network may be stored in a memory of the training or recognition apparatus, for example. In examples, the trained neural network may be stored in trained vectors, matrix or matrices, or other formats, e.g., where elements of the vectors, matrices, or other formats represent or suggest the corresponding trained weighted connections (parameters), as only examples, of the corresponding neural network structure. The stored trained neural network may further include hyper-parameter information, which may define the specific structure or architecture of the corresponding neural network for which the example stored trained parameters correspond to. The hyper-parameters may define the architecture or structure of the inputs and output layers as well as how many hidden layers there are and the function and structure/architecture of the respective hidden layers, such the respective arrangement and which are fully connected, recurrent, convolutional, de-convolutional, or pooling layers, as only examples. The hyper-parameters may further include information of the configuration and values of any bias and/or contextual nodes in the neural network, corresponding activation functions of the nodes, types of nodes, such as long short-term memory nodes, and define any or any further recurrent structures of the neural network, which may vary depending on embodiment and interpretation objective of the trained neural network.

The lightening apparatus 100 lightens the acquired parameters, and may repeat the lightening operation for each of the layers of the neural network, or for select layers of the neural network. The lightening apparatus 100 lightens the parameters using at least one of quantization, regularization, or compression. The quantization may be used to change a representation scheme to reduce a size of data, and the regularization may be used to reduce a range of values of parameters using at least one of a truncation operation or a cutoff operation. The compression may be used to reduce a size of data representing the parameter by distinguishing parameters with a value of zero from parameters with non-zero values. The quantization, the regularization, and the compression will be further described below.

In graphs of FIG. 1, each horizontal axis of the illustrated first range of the acquired parameters and the illustrated second range of the lightened parameters represent values of the corresponding parameters and each vertical axis of the illustrated first range of the acquired parameters, i.e., before lightening, and the illustrated second range of the lightened parameters represent a frequency of the corresponding parameters. In the present disclosure, a frequency of parameters may refer to a number of parameters, e.g., a number of the parameters that exist for the acquired layer. The parameters of the acquired layer may correspond to respective connection weights between a previous input or hidden layer and a current hidden layer of nodes, connection weights between nodes within a layer, or respective connection weights between a current layer and subsequent hidden or output layer of nodes. In some layers some connection weights may also be shared by multiple nodes. The parameters will have various values dependent on the training process, so the trained neural network has a unique and specialized configuration, and thus, the lightening apparatus 100 may selectively limit values of these specially trained parameters by a lightening operation. By the lightening operation, values of acquired parameters may be limited and resultant parameters are distributed in a second range that is narrower than the first range. With the narrower second range, a distribution range of the lightened parameters is more limited, and thus a memory usage when implementing the neural network with the lightened parameters may be reduced. In the following description, the first range and the second range may also be referred to as an "original range" and a "lightweight range" or "lightened range" respectively.

As the number of layers included in a neural network increases, e.g., for more sophisticated training, the amount of processing, memory, and time resources needed for recognition operations that use the increased size neural networks and for training of such increased size neural networks rapidly increases. Rather, in one or more embodiments, if the neural network is lightened, such increases in resources may be countered, and less resources may be needed.

Based on the lightening of the neural network, neural networks may be trained in a server capable of using high-level resources as well as a user device in which available resources are limited. For example, in one or more embodiments, a user may train an optimized model in real time using a user device, for example, a mobile terminal. Typical training may result in unintentional overfitting in neural networks due to biased or excessive training, which may lead to a reduction in a performance of the neural network. By lightening the neural network, it is possible to remove or alleviate unnecessary parameters that may cause such overfitting. Thus, the performance of neural networks may be enhanced through the lightening of the neural networks.

A lightening process of lightening a neural network may be applicable to various operations for training and recognition. For example, the lightening process may be applied to post-processing or tuning of completely or finally trained parameters that have been completely or finally trained, i.e., within a final accuracy or minimum error rate thresholds, or applied directly during the training of parameters. Through the lightening process, a memory space occupied by the completely trained parameters may be reduced in the lightened parameters, and the performance of the neural network with the lightened parameters may be enhanced over the original neural network by reducing the propensity of the neuro network with the lightened parameters to be overfitted to the original training data compared to the propensity of the original neural network to such overfitting.

Lightened parameters may be stored in the memory of the lightening apparatus 100 and are available for use, e.g., by the lightening apparatus 100 or another restoration apparatus, in a recognition process. The lightening apparatus 100 or such a restoration apparatus may restore the lightened parameters using at least one of dequantization, deregularization, or decompression, based on the lightening scheme that was applied to the acquired parameters of the neural network.

Figure 2:
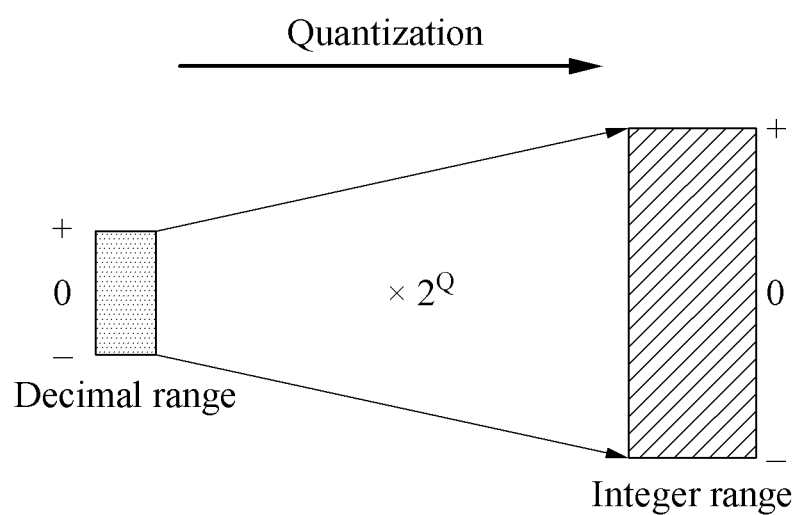
FIG. 2 illustrates an example of a quantization process.

FIG. 2 illustrates an example of a quantization process. Quantization refers to a change in a representation scheme to reduce a size of data. Parameters have a predetermined representation scheme based on a type of system or embodiment. For example, the example non-lightened (or 'original') parameters of FIG. 1 may be originally represented by decimal floating-point numbers by the corresponding training operation of the neural network. A lightening apparatus may change a representation scheme of such original parameters to reduce a size of data for lightening the original parameters. For example, the lightening apparatus may change a representation scheme of the original parameters, from the decimal floating-point numbers, to a fixed point representation of an integer. The lightening apparatus may implement a quantization function $2^Q$ for quantization, for example. As another example, a representation scheme of original parameters may be changed from a 32-bit floating-point representation to a 16-bit fixed-point representation through such a quantization function $2^Q$. Additional or alternative quantized approaches are also available.

For example, a decimal range, an integer range, a floating-point representation, and a fixed-point representation are merely examples of different representation schemes, and other well-known representation schemes are also applicable to the quantization. In addition, though examples of the original parameters have been provided where they are floating-point representations, embodiments are not limited thereto. Also, at least one of quantization, regularization, or compression is applicable to the lightening of the neural network, and accordingly the neural network may be further lightened based on the regularization and/or the compression. For convenience of description, and only as a non-limiting example, an example of quantizing the original parameters to 16-bit fixed-point integers is described below, noting alternate embodiments are also available. In this example, the quantized parameters are represented in an integer range of $-2^{15}$ to $2^{15}-1$.

Figure 3:
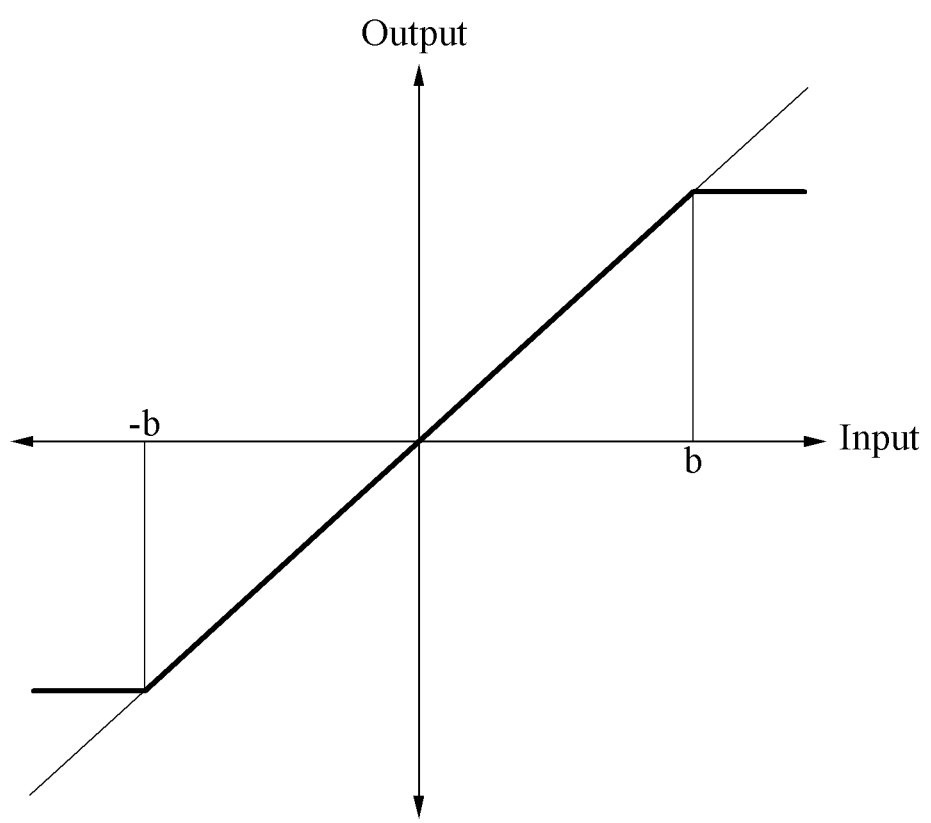
FIG. 3 illustrates an example of a cutoff operation.

FIG. 3 illustrates an example of a cutoff operation. Referring to FIG. 3, as noted above, the original parameters will have various specially trained values through a specialized training process. A lightening apparatus, such as the lightening apparatus 100 of FIG. 1, may regularize parameters, e.g., the original parameters or the quantized parameters, through at least one of a truncation operation or a cutoff operation. The cutoff operation is a setting of such parameters to have at most a maximum value and/or at least a minimum value. For example, the lightening apparatus may set parameters with values greater than or equal to the maximum value corresponding to b (e.g., $2^b$ when the example quantization is also performed) to have the maximum value, and may set parameters with values less than or equal to the minimum value corresponding to −b (e.g., $-2^b$ when the example quantization is also performed) to have the minimum value. As only an example, such as where the quantization of FIG. 2 is not performed, the lightening apparatus may set parameters with original values greater than or equal to the maximum value to b, and may set parameters with values less than or equal to the minimum value to −b, noting that embodiments are not limited thereto. Thus, in this example, the maximum value and the minimum value may be determined in advance based on the example variable b, e.g., by a selective setting of the variable b.

The existence of various values in the parameters of the neural network are advantageous in terms of a performance of a recognizer that uses the neural network, however, the performance of the recognizer may be reduced when such parameters have an excessively high value or excessively low value. Thus, the range of values of such parameters may be limited through the example cutoff operation, which may lead to an increase in the performance of the recognizer that uses a neural network with the selectively cut off parameters. Also, the size or amount of data necessary to represent the original or the quantized parameters may be reduced by limiting values of the original or quantized parameters, and thus it is possible to achieve lightening of the original or quantized parameters through the cutoff operation. To enhance or at least maintain the performance of the recognizer while reducing the size of the data, values of such parameters may desirably be cut off to an appropriate maximum value and/or an appropriate minimum value. A process of determining the variable b for the cutoff operation will be further described below. In addition, though the appropriate maximum and minimum values are described with reference to being positive and negative values corresponding to the same variable b, embodiments are not limited thereto, and thus could be set based on different variables or another alternate reliance on the same b variable.

Figure 4:
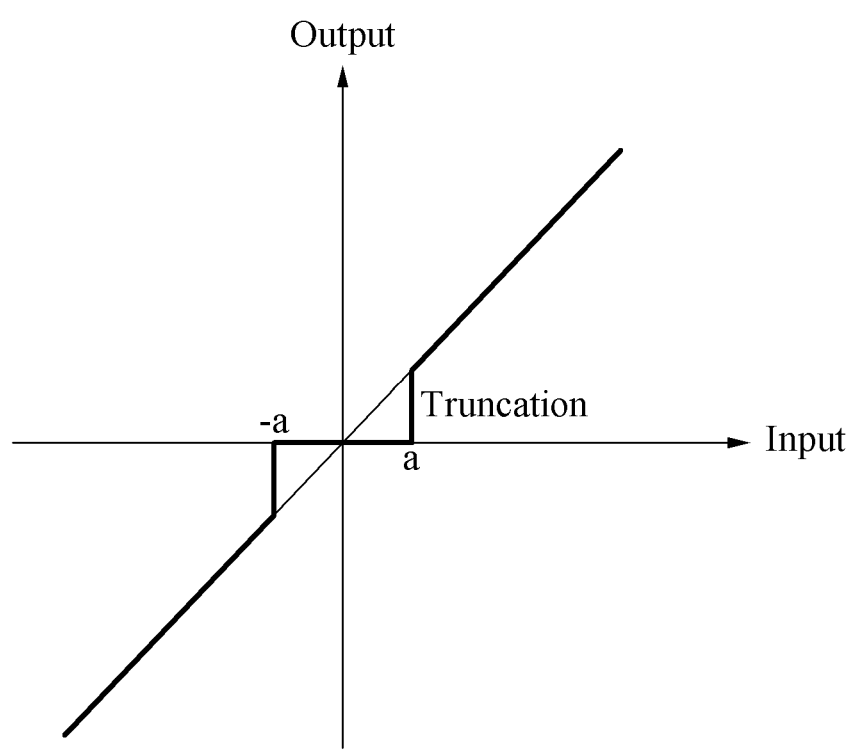
FIG. 4 illustrates an example of a truncation operation.

FIG. 4 illustrates an example of a truncation operation. Here, the truncation operation of FIG. 4 may be performed in cooperation with the cutoff operation of FIG. 3, or performed in the alternate of the cutoff operation of FIG. 3. A lightening apparatus, such as the lightening apparatus 100 of FIG. 1, regularizes parameters through the truncation operation. Referring to FIG. 4, the lightening apparatus may set parameters corresponding to a truncation range among input parameters, e.g., the aforementioned original or quantized parameters, to zero. The truncation range may be determined based on the example illustrated variable a, e.g., with the truncation range starting at a negative value corresponding to −a (e.g., $-2^a$ when the example quantization is also performed) through a positive value corresponding to a (e.g, $2^a$ when the example quantization is also performed). As only an example, such as where the quantization of FIG. 2 is not performed, the truncation range may be −a through a, noting that embodiments are not limited thereto. Input parameters with values close to zero will have relatively small influences on a performance of a recognizer that implements a corresponding neural network, whereas input parameters with a value of zero greatly reduces a size of data in a compression process according to one or more embodiments that will be described further below. Thus, by setting an input parameter with a value close to zero to zero, lightening may be maximized. However, to enhance or at least maintain the performance of the recognizer while reducing the size of the data, parameters may desirably be truncated to an appropriate truncation range. A process of determining the variable a for setting the truncation range of the truncation operation will be further described below.

Similar to above, though the variable a is discussed with regard to both extents of the truncation operation, embodiments are not limited thereto, and thus could be set based on different variables or another alternate reliance on the same variable a.

Figure 5A:
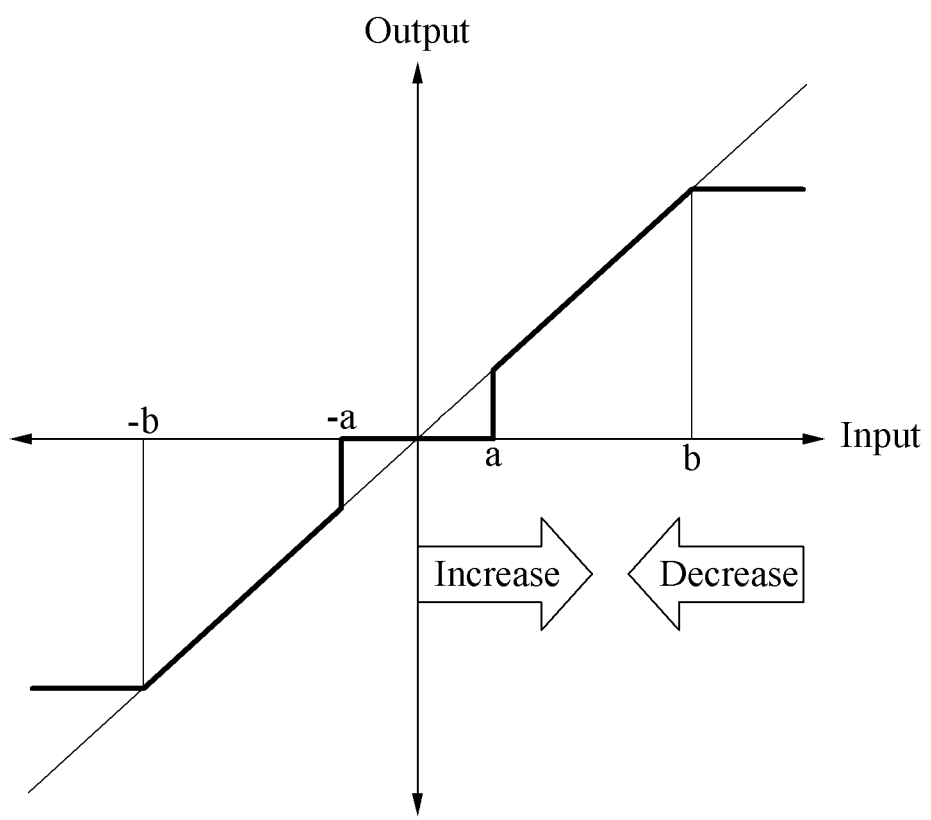
FIGS. 5A and 5B illustrate an example of a regularization operation and an example of a distribution of parameters based on the regularization operation.
Figure 5B:
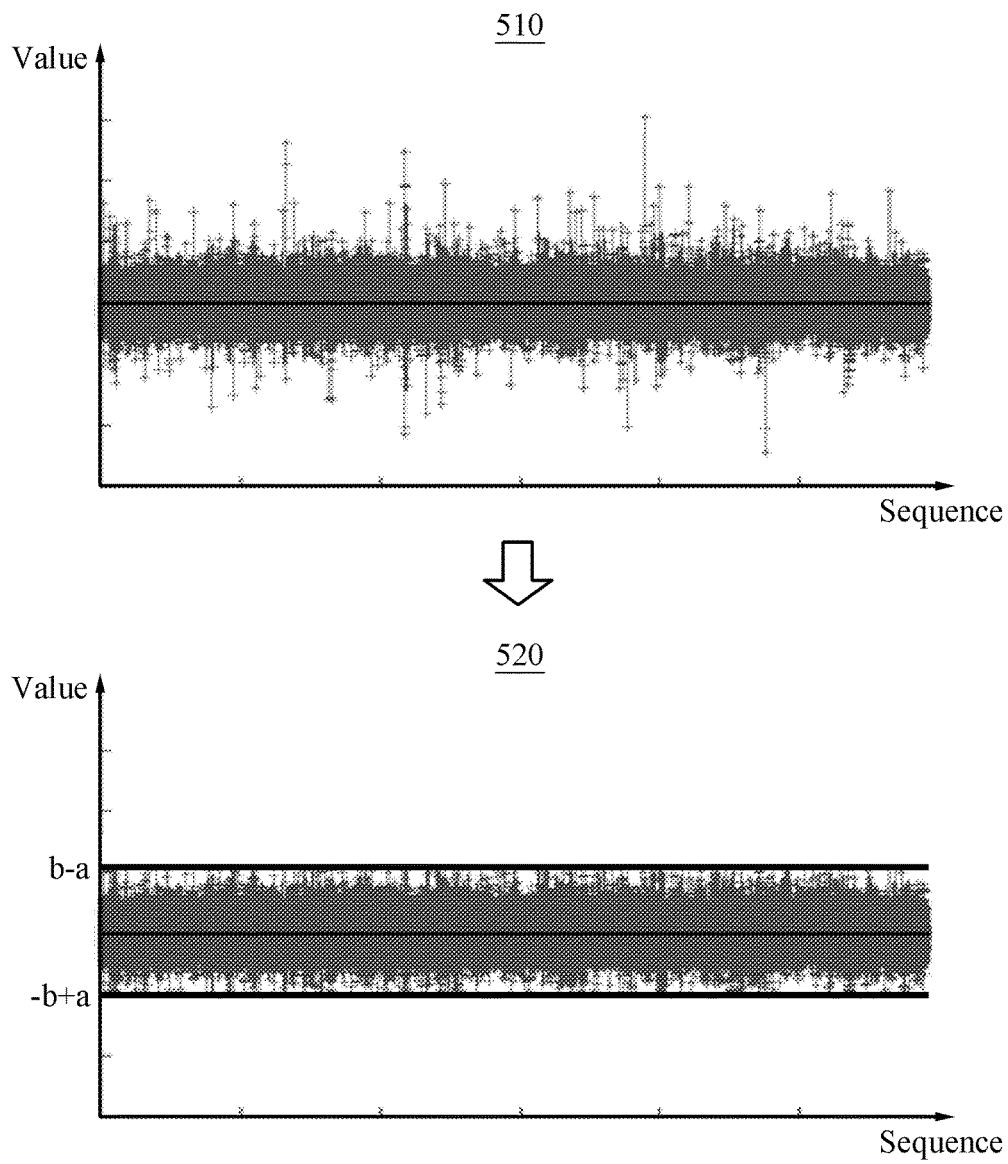

FIGS. 5A and 5B illustrate an example of a regularization operation and an example of a distribution of parameters based on the regularization operation. FIG. 5A illustrates an example of performing both a cutoff operation and a truncation operation, e.g., both the cutoff and truncation operations of FIGS. 3 and 4, such as of the aforementioned original parameters or the quantized parameters discussed with respect to FIG. 2. A lightening apparatus, such as the lightening apparatus 100 of FIG. 1, may extract an appropriate lightweight range from an original range, e.g., the respectively illustrated second range and first range of FIG. 1, to enhance or at least maintain a performance of a recognizer that implements a neural network with the lightened parameters while reducing a size of data necessary for implementing the neural network.

FIG. 5B illustrates a distribution 510 of example values of original parameters of a trained neural network that are not regularized, and a distribution 520 of values of corresponding parameters after regularization including the truncation and cutoff operations of FIG. 5A for a lightweight range and a shifting of a distribution range of the lightweight range. In FIG. 5B, the x-axes represent respective sequences of the respective parameters and the y-axes represents corresponding values of the respective parameters. The original range of the original parameters corresponds to a full range in which values of original parameters are distributed and is represented by values between an extreme minimum value (e.g., −1) and an extreme maximum value (e.g., 1) in the y-axis in the distribution 510. The lightweight range corresponds to a different range extracted by regularization of the original range and is represented as a range (for example, a range based on a minimum value corresponding to −b to lower truncation value corresponding to −a and a range based on an upper truncation value corresponding to a to a maximum value corresponding to b) in which values of the y-axis are distributed. In addition, the respective values of the parameters of the lightweight range may be shifted respectively toward zero, e.g., based on the lower and upper truncation values (−b+a) to (b−a), due to the shifting, and resulting in the illustrated distribution 520. For example, when the aforementioned quantization is implemented, the lightweight range may be determined as a range including, and as discussed below, "$-2^b$ to $-2^a$" and "$2^a$ to $2^b$." Then, when the distribution range of the parameters of the lightweight range is shifted and quantization has been also performed, for example, parameter values that fall within $-2^b$ to $-2^a$ may be shifted by $2a$ toward zero, and parameter values that fall within $2^a$ to $2^b$ may be shifted by $-2^a$ toward zero. Again, here, the lightweight range and shifted distribution range may be determined according to a regularization variable that includes variables a and b, though embodiments are not limited thereto.

Referring back to FIG. 5A, the lightening apparatus may either increases the variable a or decreases the variable b, or both, to adjust the regularization variable, for example. The lightening apparatus may iteratively adjust the regularization variable. For example, the lightening apparatus may set the regularization variable and obtain a performance index according to the set regularization variable based on the performance function, for each iteration. The lightening apparatus may perform the above operations while iteratively adjusting the regularization variable until the performance index meets a preset criterion. For example, when the performance index meets the criterion, the lightening apparatus may terminate iteration of the above operations and determine the lightweight range based on a final regularization variable. The performance index includes, for example, a recognition rate and/or an error rate.

In this example, the criterion may be set as a first criterion to realize a maximum number of iterations while preventing a performance obtained after the regularization from being less than a performance obtained before the regularization, e.g., so the regularized parameters may not result in a neural network that has a lower performance than the original neural network with the original parameters, and/or as a second criterion to increase a performance obtained after the regularization to a maximum performance, i.e., to have a performance that is superior to the performance of the original neural network, such as with a greater recognition rate or lesser error rate. Lightening may be considered maximized when the first criterion is used, and a recognition performance may be considered maximized when the second criterion is used, which will be further described below.

FIG. 6 is a flowchart illustrating an example of an iterative regularization process. Referring to FIG. 6, a target recognition rate is determined through operations 625 and 635. In operation 625, features are extracted from verification data in a verification database (DB) based on operation of a neural network with a set structure and configured according to the original trained parameters. The verification data may each include a data pair, e.g., a pair of different but related data. For example, the verification data includes a data pair corresponding to the same person, or a data pair corresponding to a different person than the neural network configured according to the original trained parameter was trained for. In such an example, the data pair may be two different images of a particular person. In operation 625, a feature of each verification data is extracted through the operation of the neural network configured according to the original trained parameters.

In operation 635, the extracted features may be matched or compared to each other to determine the target recognition rate for the original trained parameters. For example, a recognition rate is calculated by matching the respective extracted features from the data pair. In this example, the recognition rate is a verification rate (VR) that indicates a successful recognition rate of a same face, for example, from the extracted features for the data pair. For example, if the extracted features are each a feature vector of an output layer of the neural network configured according to the original trained parameters, then the matching operation may determine a similarity between the two extracted feature vectors. As feature matching results of verification data successfully recognizes or identifies the same person, the recognition rate may increase. Likewise, as feature matching results of verification data unsuccessfully recognizes or incorrectly identifies the same person, the recognition rate may decrease. Because the extracted features are dependent on the original trained parameters in operation 625, the target recognition rate is a recognition rate for the original trained parameters. In an example, the data pair from the verification data may include a pair of training image data that was used to train the neural network to obtain the original trained parameters, or they could be alternative images. In addition, though a data pair is discussed in this example, embodiments are not limited thereto, as additional or alternative verification data may also be collectively compared to discern the recognition rate of the original trained parameters. In another example, the verification data may further include data representative of a different person from which the neural network was trained to recognize, e.g., representative of a non-recognized person, to also or alternatively discern an error or correct rejection rate of the neural network configured according to the original training parameters. The matching or comparison may also merely consider the respectively indicated recognized person represented by each of the extracted feature data, such as indicated by a highest probabilistic result of the example output layer of the neural network for each input data of the data pair. In addition, though examples have been discussed with respect to the extracted features being output results of an output layer of the neural network, similar features may be extracted for each, or select, hidden layers of the neural network configured according to the original trained parameters.

The iterative regularization process of FIG. 6 may be an iterative process of continuing to search for a lightweight range for the regularized trained parameters until, as discussed above with respect to FIGS. 5A-5B, a difference between candidate regularization variables a (for example, for a truncation point) and/or b (for example, for a cutoff point) for each of the layers of a neural network is minimized and such aforementioned example criteria are met.

For example, by iterating operations 610, 620, 630 and 640, an iterative regularization process may be performed. For example, in a first iteration, in operation 610, original trained parameters may be regularized, e.g., based on first candidate variables a and b. In operation 620, features of verification data are extracted from a neural network configured with the regularized parameters corresponding to the first candidate variables. In operation 630, a candidate regularized recognition rate is calculated by matching the extracted features of the verification data, such as discussed above with respect to operations 625 and 635. In operation 640, the candidate regularized recognition rate is compared to the target recognition rate. For example, when the candidate regularized recognition rate is determined to be greater than or equal to the target recognition rate in operation 640, a second iteration is performed by returning to operation 610 and repeating operations 620 through 640. In another example, an error rate is used instead of a recognition rate. In this example, operation 640 is modified so that the iterative regularization process is iteratively performed when a candidate regularized error rate is less than a target error rate.

In an iteration subsequent to the first iteration, in operation 610, parameters regularized in previous iterations are differently regularized and updated. For example, in the second iteration a lightening apparatus, such as the lightening apparatus of FIG. 1, reduces a candidate range by either increasing the variable a or decreasing the variable b, or both. The candidate range is, for example, a range in which parameter values are distributed based on an intermediate regularization variable that is not yet determined.

In an example, as noted above, a regularization variable may also represent an offset to shift parameters regularized based on a value of zero. The lightening apparatus may increase or decrease the regularization variable through a shift operation. For example, when in the first iteration the variables a and b are initially set to "0" and "15," respectively, e.g., in the example where quantization such as discussed above with respect to FIG. 2 is also performed, a candidate range may be initially determined as the range that includes $-2^{15}+1$ to $-2^0$ and $2^0$ to $2^{19}-1$, for example. To reduce the candidate range for the second iteration, the lightening apparatus increases the variable a to "1" and decreases the variable b to "14." In this example, the candidate range for the second iteration is simply determined as a range that includes $-2^{14}+1$ to $-2^1$ and $2^1$ to $2^{14}-1$ through the shift operation. The lightening apparatus may include a shift register for the shift operation, for example. In another example, the lightening apparatus reduces the candidate range in a unit of a mini-batch. For example, the lightening apparatus may reduce the candidate range, for example, in a unit of $2^9$. Here, performance predictably changes due to an iteration when the candidate range is reduced in an appropriate large unit, and thus an appropriate regularization variable is determined by reducing the candidate range in the unit of the mini-batch.

Operations 620, 630 and 640 are performed for each iteration based on the respectively alternatively regularized parameters. When the regularized recognition rate becomes less than the target recognition rate in response to the iterative regularization process being iteratively performed, the iterative regularization process may be terminated and the regularized parameters according to the then current candidate variables are output as the optimally regularized parameters in operation 640. In an example, an error rate may be used instead of a recognition rate. In this example, when a regularized error rate for an iteration is greater than or equal to a target error rate, optimally regularized parameters are output.

The above-described iterative regularization process may be performed by, for example, the lightening apparatus 100 of FIG. 1 and/or a lightening apparatus 1120 of FIG. 11 that will be described below. For example, the lightening apparatus 1120 may receive trained parameters corresponding to original trained parameters from a training apparatus 1110, e.g., along with information about the structure of the corresponding neural network, and outputs lightened parameters for such a neural network structure corresponding to the optimally regularized parameters through the iterative regularization process of FIG. 6. The lightening apparatus 1120 may perform quantization and compression as well as the above regularization, which will be further described below. In addition, though examples are provided herein where the iterative alterations of the candidate range are performed in base 2 units, embodiments are not limited thereto, as alterative units of change for the candidate range are also available, including the upper and lower ranges of the candidate range being changed differently, and changes for the candidate range due to the example a and b variables may also or alternatively be implemented differently. Still further, such as described above with the example mini-batch example, unit changes to the candidate range may be different between iterations, e.g., depending on how large or small of a difference there is between the corresponding regularized recognition rate and the target recognition rate or a set extent of regularization.

Figure 7A:
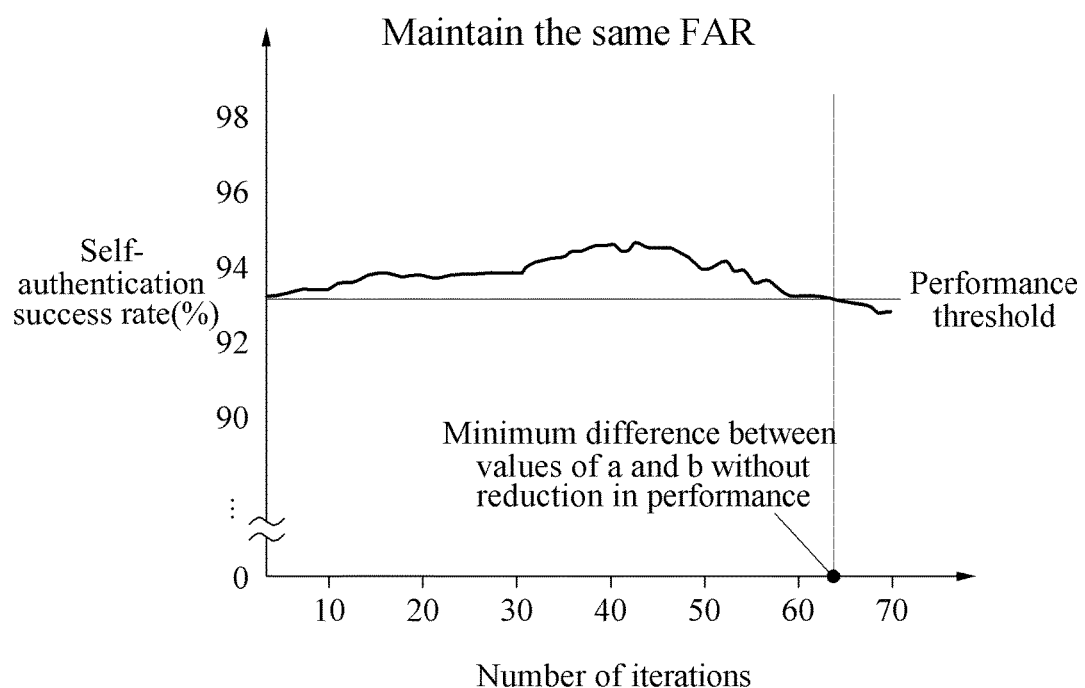
FIGS. 7A and 7B illustrate an example of a method of determining a candidate range.
Figure 7B:
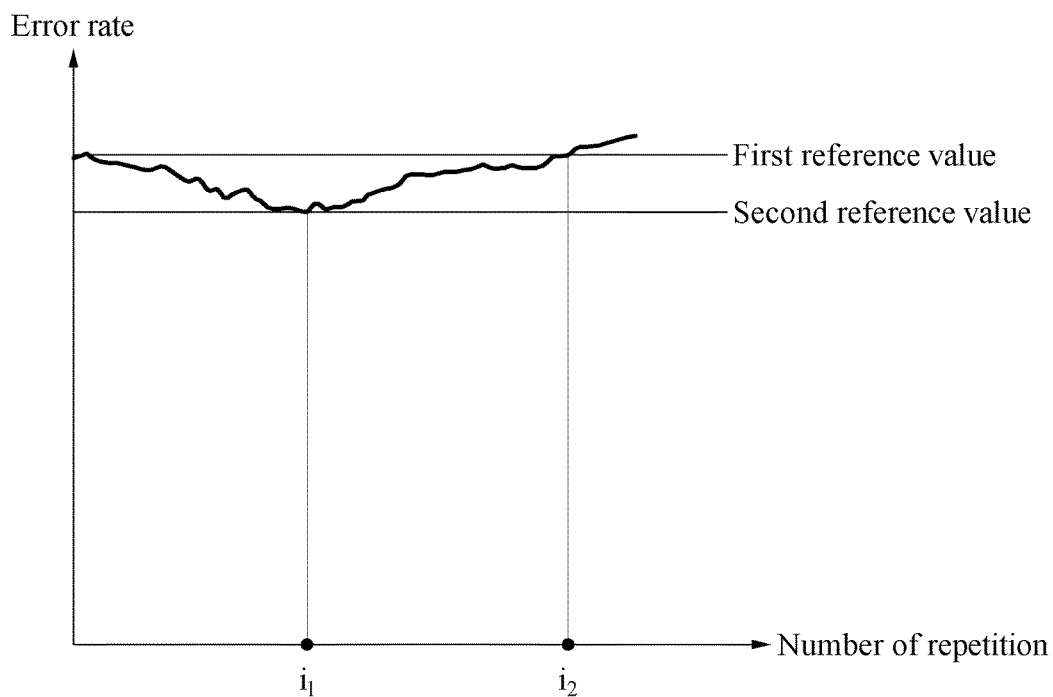

FIGS. 7A and 7B illustrate an example of a method of determining a candidate range. Referring to FIG. 7A, when the number of iterations increases, such as in increasing iterations of operations of FIG. 6, a self-authentication success rate increases a number of iterations and then decreases again. FIG. 7A illustrates variations in the self-authentication success rate when a false acceptance rate (FAR) is maintained between the illustrated iterations.

When original training parameters are regularized, values of at least some of the original training parameters may be changed from their original trained values. Despite these changes, a recognition rate is illustrated as increasing through a number of iterations, such as because the regularization of the original training parameters may reduce or dampen distortions of noise and errors that are included in a pre-trained DB. For example, when a truncation value or amount in the regularization process is controlled to increase, trained original fine connections between nodes of the neural network may be excluded, which also results in an increase in the distribution of a zero value among all regularized parameter values. In this example, such fine trained original connections represent parameters or connection weights whose values are at or below the truncation amount, such as illustrated in FIGS. 3 and 5A. Also, the regularization process may limit the degree of freedom for a maximum parameter value according to a cutoff value, such as discussed above in FIGS. 3 and 5A. Thus, distortions of noise and errors in the pre-trained DB may be mitigated by the regularization process.

As described above, a lightening apparatus according to one or more embodiments iterates parameter regularization until a self-authentication success rate increases and then decreases again to reach a performance threshold. For example, FIG. 7A demonstrates an example where the performance threshold corresponds to when the self-authentication success rate finally matches a recognition rate of the original trained parameters. As a result, the lightening apparatus may determine optimally regularized parameters (for example, parameters a and b) based on a first criterion to minimize a lightweight range instead of reducing a performance of a neural network configured according to the regularized parameters compared to the neural network configured according to the original trained parameters. In an example, the lightening apparatus may determine regularized parameters based on a second criterion to iteratively perform regularization until a recognition rate is maximized, e.g., over the neural network configured according to the original trained parameters. For this example second criterion, the performance may be maximized even though a degree of lightening is reduced compared to a maximum amount of lightening that could be implemented through the iteration process, e.g., based on the first criterion.

Compared to FIG. 7A illustrating an example where a self-authentication success (recognition) rate is considered in the regularization process, FIG. 7B illustrates an example where an error rate is considered in the regularization process. The error rate may be variously defined. For example, the error rate may correspond to a face classification training loss that indicates a loss in face recognition. Alternative error rates may also be considered.

As illustrated in FIG. 7B, as the number of iterations increases, such as in increasing iterations of operations of FIG. 6, an error rate decreases for a number of iterations and then increases again. For example, an initial error rate may be considered a first reference value, which may also correspond to an error rate for a neural network configured according to the original training parameters. As illustrated in FIG. 7B, in response to $i_1$ iterations, the error rate has decreased to a second reference value. The error rate then gradually increases back to the first reference value as the number of iterations increases from $i_1$ to $i_2$.

As described above, in an example where the regularization process considers an error rate, to maximize lightening, the lightening apparatus may determines a candidate range based on corresponding a and b variables for the $i_2^{th}$ repetition as the final lightweight range for the regularization of the original training parameters, based on the aforementioned first criterion. In another example where the regularization process considers an error rate, the lightening apparatus may determine the final lightweight range based on the aforementioned second criterion, and thus, determine the candidate range based on corresponding a and b variables for the $i_1^{th}$ iteration to be the final light weight range, to maximize performance together with some lightening of the original training parameters to an intermediate level. In this second criterion example, the performance may be maximized even though a degree of lightening isn't maximized, such as according to the first criterion.

Embodiments also include considerations of both the first and second criterions, so as to determine the final lightweight range to be between the candidate range corresponding to the maximum degree of lightening and the candidate range corresponding to the maximum increase in performance, e.g., maximum increase in recognition rate or maximum decrease in error rate. For example, a user may set a weighting or scale between the two respective candidate ranges according to the two criterions, to define where a desired emphasis should be placed from maximum lightening to maximum performance increase.

In addition, parameters may also be regularized during training of the parameters, i.e., during the training of a neural network with preset training input to derive the original training parameters. For example, intermediate parameters being trained by a training apparatus may be regularized, and thus, depending on embodiment, such regularization may also be an influence on the original training process, which will be further described with reference to FIGS. 12 and 13 and where such number of iterations of training and regularization may also be determined based on the first criterion and the second criterion similar to the above discussion with reference to FIGS. 7A and 7B.

Figure 8:
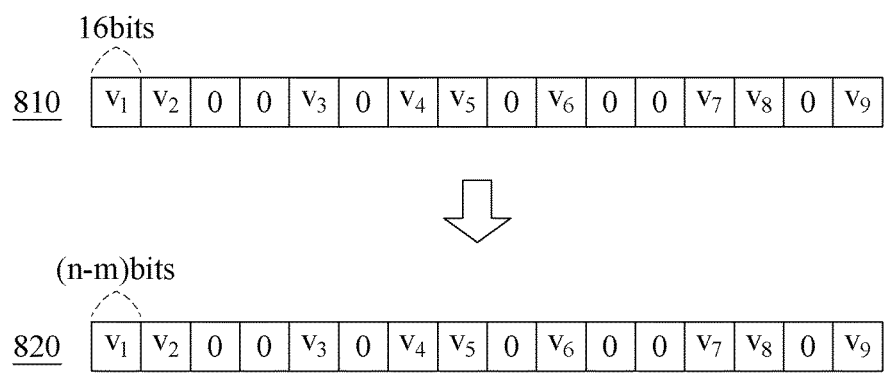
FIG. 8 illustrates an example of a change in a sequence by regularization.

FIG. 8 illustrates an example of a change in a sequence by regularization. FIG. 8 illustrates a sequence 810 of parameters that are not regularized and a sequence 820 of the parameters after being regularized. In the sequences 810 and 820, $v_i$ denotes a parameter with a non-zero value and i denotes an index of a parameter with a non-zero value, and thus, sequences 810 and 820 respectively illustrate non-zero parameters $v_1$ through $v_9$. Here, though there the number of parameters in each of the sequences 810 and 820 is "16," and embodiments are not limited thereto, FIG. 8 also illustrates that of those 16 parameters only 9 are non-zero. In this example, the parameters of sequences 810 and 820 respectively correspond to weighted connections between neighboring nodes of different layers of a model, e.g., of different layers of a neural network having a specially determined structure. As described above with reference to FIG. 2, the regularization may include the parameters of sequence 810 being quantized from 32-bit floating-point values to 16-bit fixed-point integers, for example. In an example, the aforementioned indexing information of the sequence 810 may also be obtained and utilized so the quantization of the sequence 810 selectively quantizes only the non-zero parameters of the sequence 810. The floating-point parameters of the sequence 810 may each have or require use or reservation of 16 bits in memory or storage.

Figure 11:
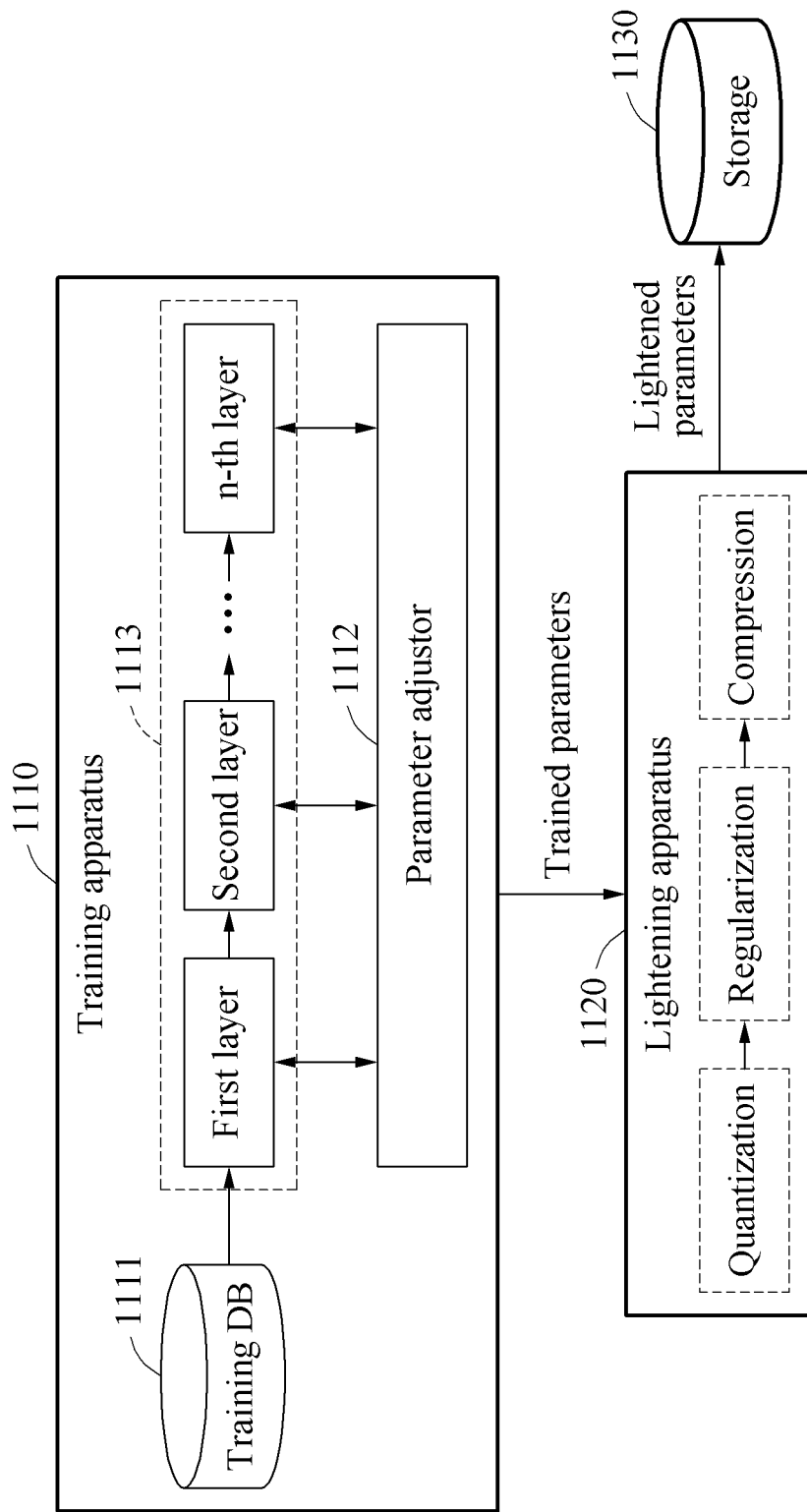
FIG. 11 illustrates an example of a post-processing process of trained parameters.

Thus, through regularization, a lightening apparatus, such as the lightening apparatus 100 of FIG. 1 or the lightening apparatus 1120 of FIG. 11, reduces a size of data representing parameters according to a lightweight range. Because a number of bits to represent parameters decreases based on a reduction in a distribution range of the parameters from an original range to the lightweight range according to such a regularization process described herein, the lightening apparatus may represent each of the regularized parameters of the sequence 820 using a smaller number of bits than necessary for representation in sequence 810 for the original range, e.g., based on the changed extents of the range of values included the lightweight range compared to the previous unlimited or larger extents of the original range of values of the original range of the non-regularized parameters. For example, the lightening apparatus may determine a minimum number of bits for representation of elements in a finite set corresponding to the lightweight range and represent the regularized parameters based on the determined minimum number of bits. For example, with respect to the example of FIG. 8, the lightening apparatus may determine min(x) that satisfies a condition "$2^x \le a$" as m, and may determine max(x) that satisfies a condition "$2^x \ge b$" as n. In this example, the regularized parameters of the sequence 820 may each have a size of "n−m" bits. Because the lightweight range is narrower than the original range, a value of "n−m" is less than "16." Thus, a bit size for each parameter may be reduced through the regularization by a value of "16−(n−m)".

As discussed below, such a reduction in required bits to represent each parameter may be, or additionally be, achieved when the regularization includes a shifting of the distribution range of the lightweight range toward zero, e.g., reducing the overall greatest parameter value to $\pm 2^{(b-a)}$ from $\pm 2^b$ and the removal of zeros created by a truncation according to $\pm 2^a$ in the regularization, as only an example.

Figure 9:
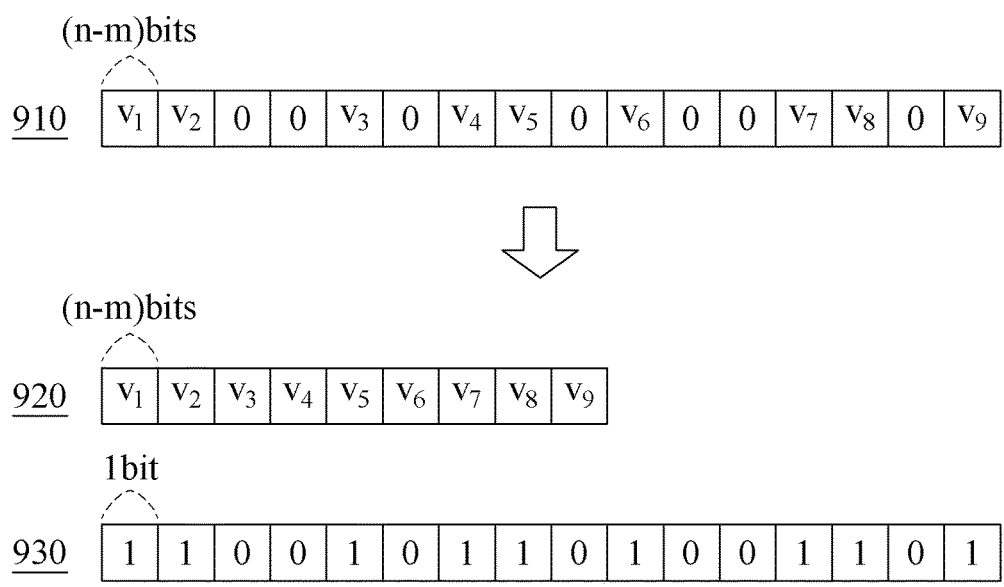
FIG. 9 illustrates an example of a change in a sequence by compression.

FIG. 9 illustrates an example of a change in a sequence by compression. A parameter that is not compressed and that has a value of zero may typically occupy or require the same memory space as that of a parameter with a non-zero value. For example, as illustrated above with FIG. 8, the regularized parameters in sequence 820 may require or reserve memory space for all parameters, even though some of the parameters have zero values. By minimizing a memory space occupied or required by parameters that have a zero value through compression, lightening based on regularization may be further maximized, for example, such as where the regularized parameters of sequence 820 of FIG. 8 are compressed to only occupy or require space for "9" ($v_1$-$v_9$) regularized parameters.

For example, FIG. 9 illustrates a sequence 910, a non-zero sequence 920, and a bit sequence 930. The sequence 910 is a parameter sequence without compression, and thus, includes space or space reservations for zero valued parameters. The non-zero sequence 920 and the bit sequence 930 are obtained by compressing the sequence 910. Similar to above with respect to FIG. 8, $v_i$ denotes parameter that have non-zero values, with i denoting an index of such non-zero value parameters. When the sequence 910 represents the regularized parameters of sequence 820 of FIG. 8, for example, the parameters of the sequence 910 each have a size of "n−m" bits due to the regularization. The lightening apparatus may losslessly compress the sequence 910 based on identification of those parameters with a value of zero. The lossless compression means that a restored sequence 910 may be a sequence that is restorable, e.g., from sequence 920 and based on index information, to identically match the original sequence 910. For example, the index information may be the bit sequence 930 that is obtained during the compression to identify which parameters of the original bit sequence 910 were non-zero and/or which were zero, and thus the compression corresponds to lossless compression.

As noted, lightening apparatus may generate the non-zero sequence 920 and the bit sequence 930 during the compression operation. Alternatively, the bit sequence 930 may be generated before the compression, or otherwise derived after compression based on consideration of the original sequence 910. In the above example, the non-zero sequence 920 includes only regularized parameters with non-zero values among all of the regularized parameters of the sequence 910, and the bit sequence 930 may provide index information regarding bit sequence 910, and thus, indicate whether or which parameters of the original sequence 910 have a value of zero, and/or which parameters of the original sequence 910 have non-zero values. In the bit sequence 930, each data is represented as 1 bit, as only an example. For example, the bit sequence 930 may have the same number of bits as a number of the parameters of the sequence 910, e.g., with the bits in the bit sequence 930 respectively corresponding to the parameters of the sequence 910. As illustrated in FIG. 9, a bit value "1" in the bit sequence 930 indicates that a corresponding parameter in the sequence 910 does not have a value of zero, and a bit value "0" in the bit sequence 930 indicates that a corresponding parameter in the sequence 910 has a value of zero. Alternatively, a bit value of "0" can be used to represent non-zero value parameters, and a bit value of "1" can be used to represent zero value parameters. The sequence 910 with the same overall bit size as a product of a value of "n–m" and a total number of parameters is represented by the same number of bits as a total number of parameters, while the sequence 920 may have a lesser overall bit size according to a product of the value of "n–m" and a number of parameters of sequence 910 with non-zero values, through the above-described lossless compression.

As discussed above with respect to distribution 520 of FIG. 5B, in such an example where the regularization includes truncation according to the variable a, for example, after such compression is performed to remove zero value parameters, the remaining non-zero parameter values within the lightweight range, e.g., quantized $-2^b$ to $-2^a$ and $2^a$ to $2^b$ may be adjusted to shift the distribution range of the example remaining parameter values, for example to shift each parameter value between $-2^b$ to $-2^a$ toward zero by $2a$ and to shift each parameter value between $2^a$ to $2^b$ toward zero by $-2^a$. Accordingly, less number of bits are required to represent each regularized parameter in the sequence 920 due to the regularization process. This shifting is also discussed further below with respect to distribution 1040 of FIG. 10, and may alternatively be performed as part of the regularization process discussed above.

The above compression effect may be more maximized as the number of parameters with zero values increases. For example, with the regularization process demonstrated in FIGS. 4 and 5a, the number of zero value regularized parameters may increase over the number of any original zero value parameters, and remaining parameter values may be shifted to adjust a distribution range of the regularized parameters, and thus, memory requirements may be further lessened by compressing such regularized parameters.

Still further, while original trained parameters may represent connection weights between nodes of neighboring layers of a correspondingly trained original neural network, for example, and accordingly are representative of the trained neural network structure having all of the nodes and weighted connections corresponding to the trained parameters, when lightening of the original training parameter is performed, such as including quantization, truncation and cutoff, distribution range shifting, and/or compression operations discussed above, the weighted connections that existed in the originally neural network may no longer exist or have zero values, then the new neural network according to the lightened parameters would have a different structure without such non-existent weighted connections. Still further, if all previous weighted connections to any original nodes also no longer exist in the lightened parameters, then the new neural network configured according to the lightened parameters may also not include those corresponding original nodes. Thus, with the lightening of originally trained parameters for a particular structured neural network, the resultant lightened parameters may define a different neural network structure than the original neural network structure, and thus, more efficiently and/or with greater performance perform the originally intended recognition, classification, or other operations compared to the efficiency or performance of the original neural network for the same intended recognition, classification, or other operations.

Figure 10:
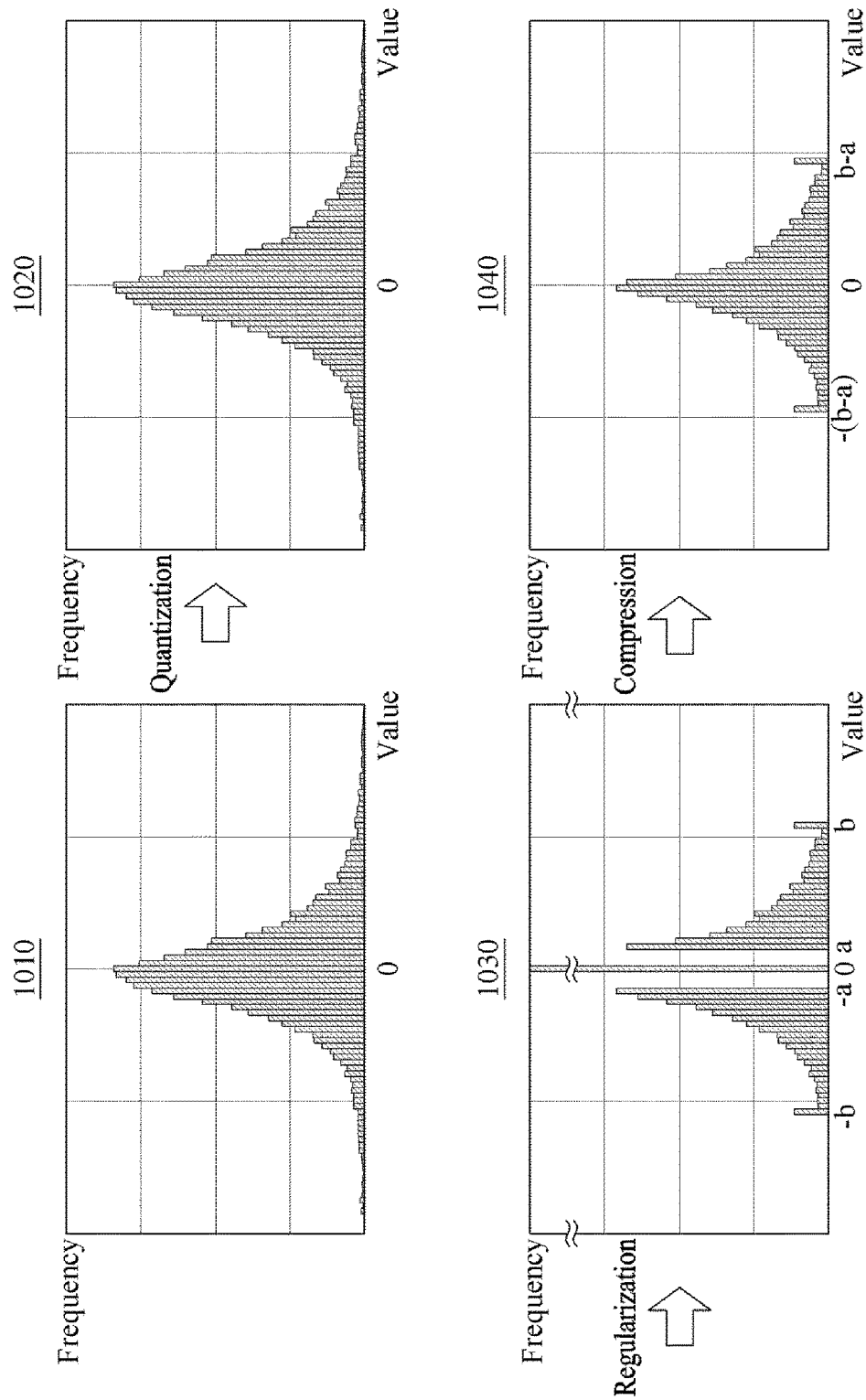
FIG. 10 illustrates an example of a change in a distribution of parameters by lightening.

FIG. 10 illustrates an example of a change in a distribution of parameters by a lightening process according to one or more embodiments. For example, FIG. 10 illustrates a distribution 1010 of original parameters that have not been lightened, a distribution 1020 of quantized parameters resulting from a quantization of the original parameters, a distribution 1030 of regularized parameters resulting from a regularization of the quantized parameters, and a distribution 1040 of compressed parameters resulting from a compression of the regularized parameters, such as implemented by one or more or all processes described above with respect to FIGS. 2-9. As demonstrated by the distributions 1010 through 1040, distributions of parameters are greater the closer the parameters are to having a zero value, e.g., the largest number of parameters are centered around a value of zero, while distributions lessen farther away from zero. Said another way, a frequency of parameters decrease as the value of the parameters increases, such that there are less large value parameters than there are small value parameters. Here, though quantization causes a representation scheme of parameters to change, the corresponding distribution may not change due to the quantization, as demonstrated between distributions 1010 and 1020.

In the regularization process, parameters in a truncation range, for example, a range corresponding to –a to a (e.g., $-2^a$ to $2^a$), may be set to zero through a truncation operation. Also, in the regularization process, parameters with values greater than or equal to a maximum value corresponding to b (e.g., $2^b$) and parameters with values less than or equal to a minimum value corresponding to –b (e.g., $-2^b$) may be set to have the maximum value corresponding to b or the minimum value corresponding to –b, through a cutoff operation. Thus, in the distribution 1030, the frequency of parameters with a value of zero increases due to the truncation operation, and a frequency of parameters with the maximum value corresponding to b and the minimum value corresponding to –b increase due to the cutoff operation.

In the compression process and as shown in distribution 1040, the parameters with the value of zero in the distribution 1030 have been removed and the distribution range has been shifted toward zero corresponding to a for the parameter values below zero and corresponding to –a for the parameter values above zero. Thus, the distribution 1040 includes the above-described parameters with non-zero values due to the compression and shifting of the distribution range. For example, parameters with a value of zero are identified by the above-described bit sequence 910 of FIG. 9. In the distribution 1030, the parameters are distributed in a range corresponding to variables –b and –a and a range corresponding to variables a and b and otherwise distributed with the value of zero, corresponding to the lightweight range. As discussed above, the parameter values distributed with the zero may be removed by the compression operation, and the distribution range of the lightweight range may then be shifted by the lightening apparatus reducing absolute values of the parameters of the lightweight range by a value corresponding to the variable a, thereby shifting parameter values within the range corresponding to variables −b and −a toward zero, and shifting parameter values within the range corresponding to variables a and b toward zero, to further minimize a number of bits for representing parameters from a regularization process. Thus, in the distribution 1040, a shifted extent of the lightweight range value b is reduced to a value corresponding "b−a" due to a reduction in the absolute values of the parameters, and accordingly the number of bits for representing parameters is reduced. Thus, the shifted lightweight range is determined as a range parameter values corresponding to "−(b−a)" through parameter values corresponding to "b−a." Also, each of the parameters in the shifted lightweight range may now be represented by a number of bits corresponding to log 2(b−a), substantially reducing the required number of bits to represent parameter values compared to the original trained parameter values, for example. For example, when values of the parameters are integers within the lightweight range, a number of cases for each of the parameters may be obtained by "2*(b−a)+1." Each of the parameters may thus be represented by bits of a minimum natural number greater than or equal to a value of "$\log_2(2*(b-a)+1)$."

As only an example, in one or more embodiments, the trained neural network may be a deep convolutional neural network (DCNN), and embodiments may further include the training of the DCNN based on a number of sample training images or other non-image training data with connection weightings being adjusted through multiple iterations, such as through backpropagation training, until the DCNN accurately recognizes input images or performs desired objectives. For example, in the below example, the neural network is referred to as having ten convolutional layers, though embodiments are not limited thereto and there may be more or less than the example ten convolutional layers.

values, one or more further convolutional layers that respectively generate features through respective convolutions, further pooling layers, etc., and an example one or more fully-connected layers configured to classify, for example, features transferred from one or more previous layers. The fully-connected or dense layer may include multiple fully-connected or dense layers. There may be multiple convolution layers which respectively perform convolutional filtering, for example, on connected results from a previous layer, e.g., with the convolutional layers each outputting three-dimensional boxes whose dimensions may depend on the filter size of the corresponding convolutional layer. In addition, there may be weighted connections to each convolutional layer in correspondence to each pixel of the corresponding convolutional layer and for each filter of the corresponding convolutional layer. Through convolution of multiple filters across the pixels in each convolution layer, due to the respective configurations of each convolution layer, distinguishing features of input (from the previous layer or input layer) example image may be recognized. The DCNN may further include multiple pooling layers that may each respectively downsample input pixels or three-dimensional boxes from a previous layer, such as without weighting, for example. Thus, the DCNN may have a complex architecture, where many parameters of the DCNN that can and may be varied during the training process until trained parameters and hyper-parameters of the DCNN with an acceptable error rate are found.

For example, for a DCNN with ten convolutional layers, each having input connection weights (parameters) for S×width×height and respective T output connection weights, the respective typical connection weighting parameters and example typical memory requirements may be as below in Table 1, for example.

TABLE 1

| Conv. Layer | Number of Convolution Connection Weights (Parameters) | | | | Number of Para. | Memory |
|---|---|---|---|---|---|---|
| | T (Output) | S (Input) | d (Height) | d (Width) | T * S * d * d | (Mbyte) |
| 1st Layer | 32 | 3 | 3 | 3 | 864 | 0.003296 |
| 2nd Layer | 64 | 32 | 3 | 3 | 18432 | 0.070313 |
| 3rd Layer | 64 | 64 | 3 | 3 | 36864 | 0.140625 |
| 4th Layer | 128 | 64 | 3 | 3 | 73728 | 0.28125 |
| 5th Layer | 96 | 128 | 3 | 3 | 110592 | 0.421875 |
| 6th Layer | 192 | 96 | 3 | 3 | 165888 | 0.632813 |
| 7th Layer | 128 | 192 | 3 | 3 | 221184 | 0.84375 |
| 8th Layer | 256 | 128 | 3 | 3 | 294912 | 1.125 |
| 9th Layer | 160 | 256 | 3 | 3 | 368640 | 1.40625 |
| 10th Layer | 320 | 160 | 3 | 3 | 460800 | 1.757813 |
| | | | Total | | 1751904 | 6.682983 |

As another example, the DCNN may have a LeNET-5 architecture, a Shift-invariant neural network architecture, neural abstraction pyramid architecture, or other architecture format. Still further, the DCNN may have a parallel architecture where convolutions are performed simultaneously in respective parallel layers, the results of which are ultimately combined in a subsequent same layer. Respective layers of the DCNN may be classified based on a function or operation of each layer, and the DCNN may include one or more convolutional layers configured to respectively generate, e.g., extractable or storable, features through respective convolutions performed on input data, a pooling layer configured to perform abstraction to map a plurality of pixels or values from a previous layer to a lesser number of pixels or As demonstrated above in Table 1, and noting that such a DCNN may include further example connected or fully-connected hidden layers for which additional connection weightings would be or have been trained, substantial resources may be expended in both storing the trained connection weightings and in the use of the trained DCNN in a recognition operation, for example, especially as each connection weighting may represent respective calculations that would be performed by one or more processors of the example recognition apparatus for input or captured data, such as a captured image.

When any of the above or any combination of the above-described lightening processes is applied to each of plural layers in such a neural network, e.g., after training of the DCNN has been completed thereby specially defining the final trained parameters for that now specialized DCNN. The lightening process may be applied differently for each of the layers, such as differently for each of the example ten convolutional layers of the DCNN. For example, one or more of the lightening operations described above with respect to FIGS. 2 through 10 may be implemented, and they may be differently selectively applied to different layers. For example, lightening may not be applied to the above example first layer, lightening through only a cutoff operation may be applied to the example second layer through the example eighth layer, and lightening through only the cutoff and truncation operation may be applied to the example ninth layer. Also, lightening through only the truncation operation may be applied to the example tenth layer, or any combination of such selective one or more or all lightening operations of FIGS. 2-10 may selectively performed.

Compared to the operation of the above example of Table 1, a recognition performance of such an optimally lightened neural network according to one or more examples, e.g., in accordance to the above selective lightening operations that are performed on different layers of the DCNN, may be equal or superior to a recognition performance obtained before the lightening, while the model size for new DCNN neural network configured according to the respectively lightened parameters may be greatly reduced.

Accordingly, one or more embodiments provide technological improvements that may include improving the processing operation of a recognition apparatus, reduce space requirements, improve memory access speeds, and/or improve recognition results. Further, with one or more embodiments, more complex and sophisticated trained neural networks may be performed on processing systems that have lesser capabilities, such as in mobile examples, while such trained neural networks may not have been available for implementation without model lightening described herein or may not have been able to be performed with sufficient speed to operate in real-time during operation of such recognition apparatuses, for example. Such model lightening may further reduce or eliminate a previous necessity to off load processing for image or other data recognition to a remote server, for example. In addition, though examples have been discussed with respect to convolutional neural networks (CNNs) or neural networks with convolutional layers, embodiments are not limited thereto and embodiments include other neural networks and model approaches.

In addition, when output map channels in each of plural layers, for example, convolutional layers, are classified, a lightening process may be applied differently for each of the output map channels, and thus for a single layer there may be multiple lightening operations performed and one or more or all of such lightening operations may be different or they may all be the same. In an example, a convolutional layer may include the same number of output map channels as a number of channels of a kernel or filter corresponding to the convolutional layer.

As another example, for the neural network that includes a plurality of layers each including nodes, and weighted connections that connect nodes in neighboring layers, values of the weighted connections that are greater than zero and less than a value corresponding to a regularization variable a, which is also greater than zero, are all or at least partially set to zero. In this example, connection weights set to zero correspond to weighted connections that connect nodes from neighboring layers among the plurality of layers. The regularization variable a may be set differently for each of the plurality of layers and/or for each output map channel in a predetermined layer, such as when the layer is a convolutional layer. Here, it is also noted that convolutional layers may also have different structures within the neural network.

In another example, regularization through a truncation operation and a cutoff operation may be applied to such a neural network, so connection weights (i.e., parameters) with values greater than a value corresponding a regularization variable b, which is also greater than the value corresponding to the regularization variable a, are all or at least partially set to the value corresponding to the regularization variable b. Connection weights set to the value corresponding to the regularization variable b correspond to weighted connections that connect neighboring layers among the plurality of layers, similar to the other non-zero regularized connection weights. Here, the regularization variable b may be set differently for each of the plurality of layers and/or for each output map channel in a predetermined layer, such as when the layer is the convolutional layer.

In still another example, regularization through a cutoff operation may be applied to the neural network, such that connection weights with values greater than a value corresponding to a regularization variable b that is greater than zero are all or at least partially set to the value corresponding to the regularization variable b. In this example, connection weights set to the value corresponding to the regularization variable b correspond to weighted connections that connect neighboring layers among the plurality of layers, similar to the other non-zero regularized connection weights. The regularization variable b may be set differently for each of the plurality of layers and/or for each output map channel in a predetermined layer, such as when the layer is the convolutional layer.

FIG. 11 illustrates an example of a post-processing process of trained parameters. Referring to FIG. 11, the training apparatus 1110 includes a training DB 1111, a parameter adjustor 1112 and a plurality of layers 1113, for example, a first layer, a second layer or an n-th layer, such as discussed above with respect to FIG. 10 and example parameter based models, including deep convolutional or other neural networks as only examples.

Thus, as discussed above, the training apparatus 1110 trains the plurality of layers 1113 based on the training DB 1111. As only an example, the training DB may include labeled images, e.g., images for which properties or associations are each known such that the plurality of layers can be trained to generate or provide output in conformance with such known properties or associations. In this example, the training may be considered supervised training, though embodiments are not limited thereto. In the training, the parameter adjustor 1112 adjusts parameters of the plurality of layers 113 based on determined losses through the first layer through the n-th layer, such as through an iterative backpropagation algorithm as only an example. The loss may be a log loss, multi-class log loss, mean squared error or quadratic error, cross entropy error, etc. In the example, where the training is performed using a backpropagation or gradient descent algorithm, respective gradients of the connection weights for nodes of the neural network, for example, may be determined and connection weights iteratively adjusted based on the gradient. The parameter adjusting by the parameter adjuster 1112 may also incorporate into the iterative training operation certain additional operations, such as model selection, pruning, Gaussian or Laplace regularization, and layer/node dropouts, each of which is distinguished from the lightening operations described herein, though such lightening operations may further include any of such additional operations, to ultimately generate the trained parameters. The training apparatus 1110 transmits the trained parameters to the lightening apparatus 1120. The training apparatus 1110 is representative of including a non-transitory memory, such as to store the training DB 1111 and the trained parameters. In an example where the training apparatus 1110, lightening apparatus 1120, and storage 1130 are included in a single device or system, the trained parameters may also or alternatively stored in the storage 1130. Alternatively, where the lightening apparatus 1120 is separate or remote from the training apparatus 110, such as where the lightening apparatus 1120 is a remote server or representative of a recognition apparatus that also includes the storage 1130, the remote server or recognition apparatus may be provided the trained parameters, e.g., as a first provision or update to an existing neural network of the remote server or recognition apparatus, such as by either pushing the trained parameters or in response to the remote server or recognition apparatus requesting the trained parameters. The trained parameters may be stored in vectors, matrix or matrices, or other format for plural or respective multiple layers, for example. Thus, the lightening apparatus 1120 lightens the trained parameters through a post-processing process, i.e., after the trained parameters have been finally determined by the training apparatus 1110 for a successful training of the corresponding neural network. The lightening apparatus 1120 lightens the trained parameters based on any of the quantization, regularization, or compression, or any combination of the same, operations that have been described above in FIGS. 1-10, or described further below. The lightening apparatus 1120 stores the lightened parameters in a storage 1130. The lightened parameters stored in the storage 1130 may then be used in a recognition process to perform recognition similar to the neural network defined by the trained parameters but through a neural network that has a different configuration, i.e., in a neural network that is specially configured according to the lightened parameters. The lightening apparatus 1120 may further provide the lightened parameters to such a recognition apparatus, or when the lightening apparatus is the recognition apparatus the lightening apparatus 1120 may further perform recognition by capturing or obtaining an image, for example, and applying that image to the specialized neural network configured according to the lightened parameters. As noted above, though the training apparatus 1110, the lightening apparatus 1120, and the storage 1130 may be physically separate devices, embodiments are not limited thereto, as at least two of the training apparatus 1110, the lightening apparatus 1120, or the storage 1130 may be included in a single apparatus. The lightening operations of the lightening apparatus 1120 may also be implemented only through a specially configured hardware module or implemented through hardware and instructions stored in/on non-transitory media that, when executed by one or more processors of the hardware, for example, cause the processor to implement any or all of the quantization, regularization, and compression operations.

Figure 12:
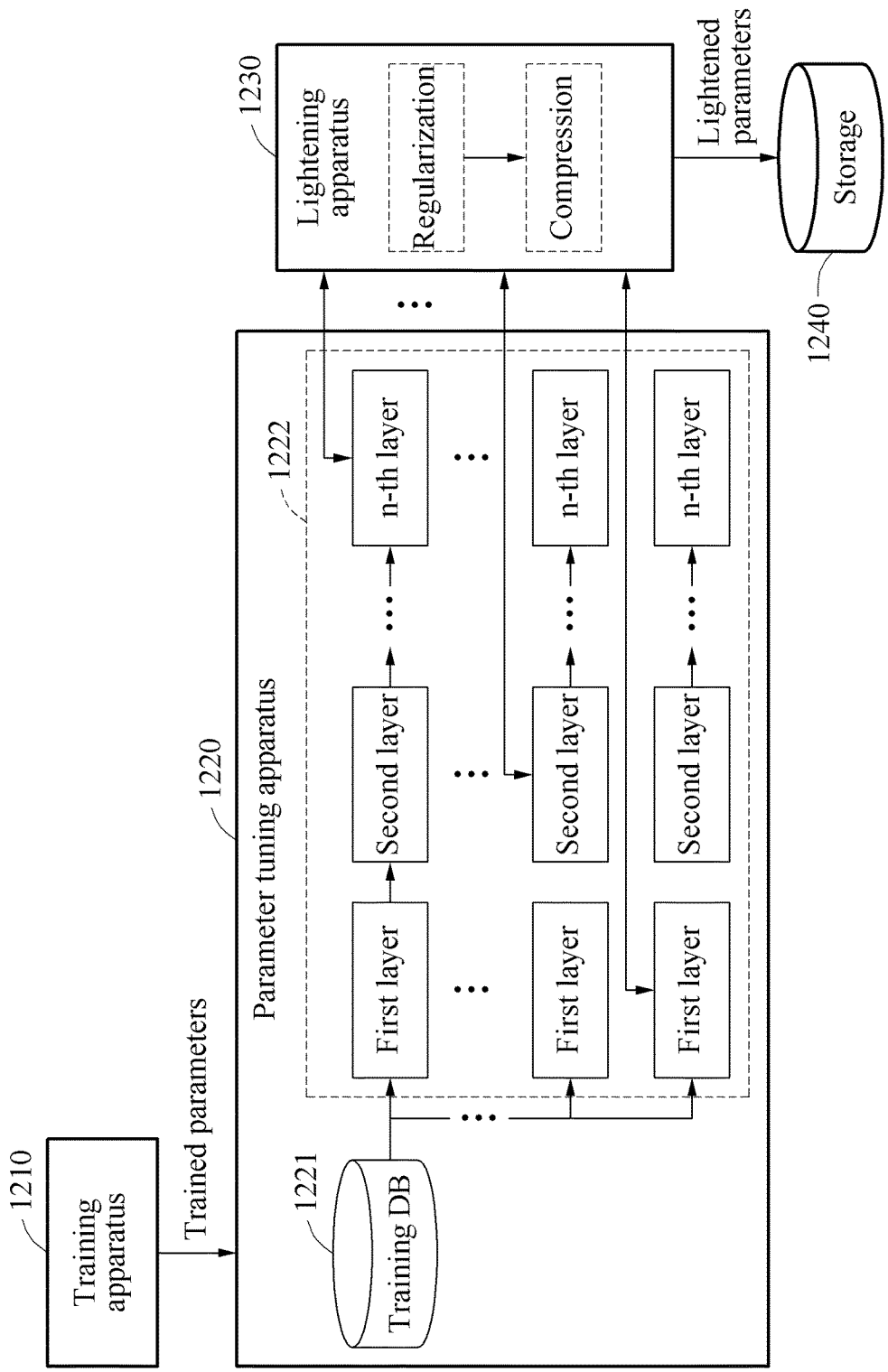
FIG. 12 illustrates an example of a parameter tuning process of trained parameters.

FIG. 12 illustrates an example of a parameter tuning process. Referring to FIG. 12, a parameter tuning apparatus 1220 includes a training DB 1221 and a plurality of layers 1222, for example, first layers, second layers, through n-th layers. To perform fine tuning of parameters that are trained and received from a training apparatus 1210, the parameter tuning apparatus 1220 trains the plurality of layers 1222 using the training DB 1221. The training apparatus 1210 may correspond to the training apparatus 1110 of FIG. 11 and above discussions with respect to FIG. 10, for example, though embodiments are not limited thereto. The training DB 1221 may include the same training data as used by the training apparatus 1210 to generate the trained parameters, or may include only some or different images. In an example, the training DB 1221 may correspond to the verification DB of FIG. 6, and the lightening apparatus 1230 and the parameter tuning apparatus 1220 may operate cooperatively to perform the operations of FIG. 6, such as to iteratively train the parameters of a select layer by selectively varying the aforementioned regularization a and b variables, for example.

The parameter tuning apparatus 1220 applies the trained parameters received from the training apparatus 1210 to the plurality of layers 1222 and additionally trains each of the first layers through the n-th layers in the plurality of layers 1222. The plurality of layers 1222 may initially be configured the same as the neural network defined by the input trained parameters, and thus, the same configuration as the neural network trained by the training apparatus 1210. Parameters of layers other than a layer to be additionally trained are fixed to their original values as input from the training apparatus 1210. For example, as illustrated in the first row of plural layers in FIG. 12, when the parameter tuning apparatus 1220 additionally trains the n-th layer, parameters of the first layer through an (n−1)-th layer may be fixed. The parameter tuning apparatus 1220 may also be included in the lightening apparatus of FIG. 11, for example.

For such additional training, a lightening apparatus 1230 is used. The lightening apparatus 1230 regularizes parameters of a layer to be additionally trained, based on a function to evaluate a loss of a feature vector, as discussed above. For example, the lightening apparatus 1230 may set a candidate range that minimizes the loss of the feature vector as a lightweight range, or for a corresponding layer, layer portion, or the neural network overall minimizes corresponding errors or losses or maximizes corresponding performances, and thus perform regularization as discussed above. The lightening apparatus 1230 may also quantize parameters, although not shown in FIG. 12, as discussed above.

The lightening apparatus 1230 also lightens the parameters by compressing the regularized parameters. Either in the regularization or the compression, the lightening apparatus 1230 may also shift a distribution range of parameters that have been truncated or cut off, for example, in the regularization operation, toward zero to reduce the maximum value of the parameters to further reduce a bit size of the parameters, for example. The lightening apparatus 1230 stores the lightened parameters in a storage 1240. The parameters stored in the storage 1240 are used in a recognition process.

In FIG. 12, the first layers through the n-th layers overlap in the plurality of layers 1222, however, this is merely an example for convenience of description. For example, a single first layer through a single n-th layer may be included for each operation, e.g., each parallel performed operation. In this example, the single first layer through the single n-th layer may be sequentially trained or tuned. In the example of FIG. 12, where each selected different single layer is respectively tuned individually through parallel lightening operating processes, respective overall error or performance changes due to changes to parameters of a corresponding selected single layer may be more easily observed, compared to where multiple parameter changes across varying layers are adjusted, i.e., through such a single layer adjustment approach the positive or negative effect of the particular current changes to parameters of the single layer can be more easily observed. For example, an overall error rate or recognition rate may be known for an original neural network configured according to the trained parameters, and either or both of those rates can be compared to the respective outputs of the output layer, e.g., n-th layer, for each of the parallel lightening operations such as discussed above with respect to FIGS. 6-7B.

In FIG. 12, the training apparatus 1210, the parameter tuning apparatus 1220, the lightening apparatus 1230, and the storage 1240 may be physically separate devices, though embodiments are not limited thereto. For example, at least two of the training apparatus 1210, the parameter tuning apparatus 1220, the lightening apparatus 1230, or the storage 1240 may be included in a single apparatus, such as discussed above with respect to FIG. 11. The lightening operations of the lightening apparatus 1230 and/or tuning operations of the parameter tuning apparatus 1220 may also be implemented only through specially configured hardware module or implemented through hardware and instructions stored in/on non-transitory media that, when executed by one or more processors of the hardware, for example, cause the processor to implement any or all of the parameter tuning, quantization, regularization, and compression operations.

Figure 13:
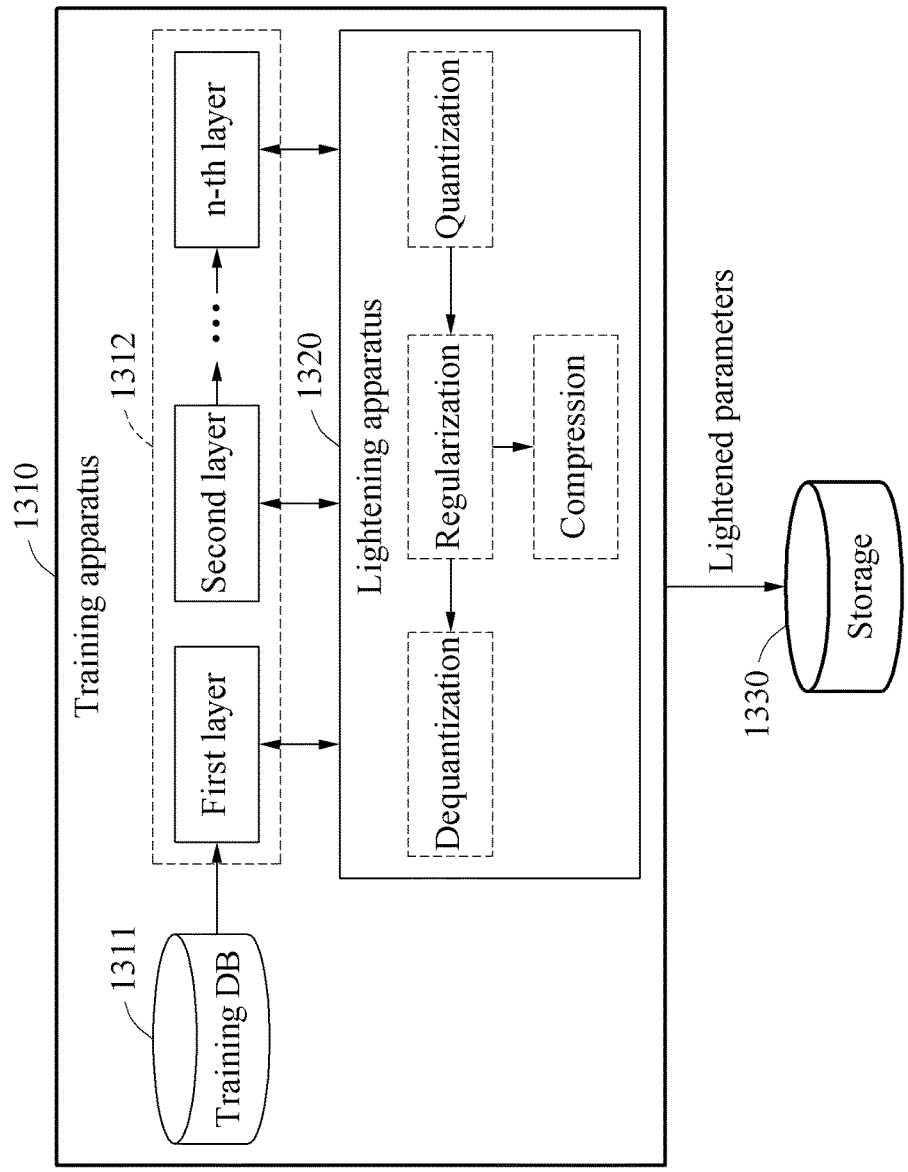
FIG. 13 illustrates an example of a training process.

FIG. 13 illustrates an example of a training process. Referring to FIG. 13, a training apparatus 1310 includes a training DB 1311, a plurality of layers 1312, and a lightening apparatus 1320. The lightening apparatus 1320 regularizes parameters during training of the plurality of layers 1312.

The lightening apparatus 1320 trains the plurality of layers 1312 based on parameters represented by data with a reduced size through lightening according to one or more embodiments. The lightening apparatus 1320 may correspond to any of the above described lightening apparatuses. For example, the training apparatus 1310 trains the plurality of layers 1312 based on the training DB 1311, as discussed above with respect to FIGS. 10-12. For example, the training apparatus 1310 may perform iterative training to reduce losses through a multi-pass backpropagation, and iterative training operations may further include certain additional operations, such as model selection, pruning, Gaussian or Laplace regularization, and layer/node dropouts to determine preliminarily final parameters, for example. The lightening apparatus 1320 may quantize such preliminarily final parameters of an n-th layer and regularize the parameters of the n-th layer so that a loss of the n-th layer is minimized, such as after the iterative training of the plurality of layers 1312 based on the training DB 1311 by the training apparatus 1310 or during the training process when comparing the corresponding losses during backpropagation for the n-th layer during the training process as discussed above. In such examples, the regularized parameters are compressed and stored in a storage 1330. Also, the regularized parameters are dequantized and applied to the n-th layer. For example, when the lightening apparatus 1320 performs such lightening during the iterative training process of the plurality of layers 1312 based on the training DB 1311 by the training apparatus 1310, the lightening may be performed after each pass of the training or after a number of passes in the iterative training process, and select layers or all layers may be lightened by the lightening apparatus 1320 at the same time or at different times such as in different passes. When the lightening apparatus 1320 performs such lightening after the iterative training process, then the training apparatus 1310 may reuse the trained first through n-th layers and thereby re-train the respective layers, such as discussed above with respect to FIG. 12, as only an example. Similar to the n-th layer, the lightening apparatus 1320 performs quantization, regularization, compression and dequantization of an (n−1)-th layer, e.g., respectively toward and through the example first layer. Lightened parameters are stored in the storage 1330 and are used in a recognition process.

In FIG. 13, the training apparatus 1310 is illustrated as including the lightening apparatus 1320. However, the training apparatus 1310 and the lightening apparatus 1320 may be physically separate devices. Also, in FIG. 13, the training apparatus 1310 and the storage 1330 are illustrated as being separate from each other, however, the storage 1330 may be included in the training apparatus 1310. The training apparatus 1310 may also be a recognition apparatus and be configured to capture or obtain an image, for example, and apply the lightened neural network that is specially configured according to the lightened parameters. The lightening operations of the lightening apparatus 1320 and/or training operations of the training apparatus 1310 may also be implemented only through specially configured hardware module or implemented through hardware and instructions stored in/on non-transitory media that, when executed by one or more processors of the hardware, for example, cause the processor to implement any or all of the parameter training, quantization, regularization, and compression operations.

Figure 14:
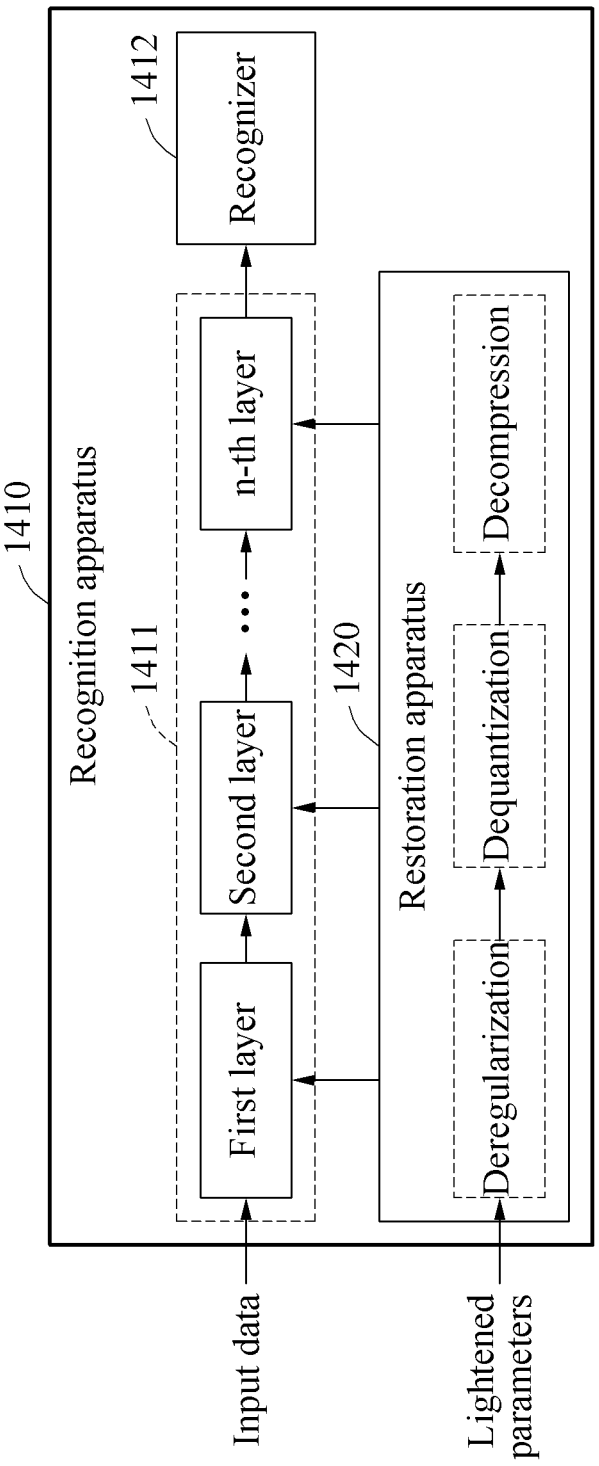
FIG. 14 illustrates an example of a recognition process.

FIG. 14 illustrates an example of a recognition process of a recognition apparatus, such as any of the above discussed recognition apparatus example implementations. Referring to FIG. 14, a recognition apparatus 1410 includes a model with a plurality of layers 1411, a recognizer 1412, and a restoration apparatus 1420. The model may be neural network, for example, though operations herein with reference to such neuro network implementations that implement one or more or all of the lightening operations are not limited to neural networks. The restoration apparatus 1420 restores lightened parameters and applies the restored parameters to the plurality of layers 1411, or generates the plurality of layers 1411 based on the lightened parameters and/or any additional parameter and/or hyper parameter information included with the lightened parameters. The lightened parameters may have been generated by any of the above lightening apparatuses or processes. The plurality of layers 1411 extract respective feature vectors from input data based on the applied parameters, e.g., through application of connection weights between nodes of the plurality layers respectively represented by the lightened parameters, and the recognizer 1412 recognizes an object in the input data based on the feature vectors. The recognizer 1412 may analyze the output of the n-th layer, for example, such as an output softmax layer of the neural network specially configured according to the lightened parameters, and determine the recognition result. As only an example, the recognizer 1412 may determine that the output of the example output softmax layer indicates that the input data represents a known user or person, which known user or person, whether the person is not known, or some other object or characteristic of an object, noting that the recognizer 1412 may implement varied operations depending on originally trained goal of the original neural network. The recognizer 1412 may further control other operations of the recognition apparatus 1410, such as to authorize a recognized person to enter a secure area, operate a locked user interface or feature, or use stored credit card information for a purchase, as only non-limiting examples.

Still further, the lightened parameters may also include parameters that are fixed from their original values, e.g., parameters for layers that were lightened and/or for layers that were not lightened, and thus, though the first through n-th layers are illustrated, additional layers may also be generated or used depending on the lightened parameters. The recognition apparatus 1410 may also separately receive the non-lightened parameters for non-lightened layers when the input lightened parameter includes only parameters for layers that were lightened, for example, or the recognition apparatus 1410 may have previously received or obtained the parameters for the non-lightened parameters, such as an in an example where the recognition apparatus 1410 received the original trained parameters and requested any of the above lightening apparatuses to lighten the same, in which case the currently received lightened parameters would be in response to that request, noting that alternative and/or additional embodiments are also available. In this example, if the recognition apparatus 1410 previously received all of the original trained parameters, then the first through n-th layers may exist from their previous generation based on the original trained parameters and one or more of the layers may be reconfigured according the lightened parameters to generate the new lightened neural network, for example. As noted above, the recognition apparatus 1410 may still further include any of the aforementioned lightening apparatuses.

The restoration apparatus 1420 may acquire the lightened parameters from the above-described storage 1330 of FIG. 13, for example. The storage 1330 may also be a server that can provide the lightened parameters based on a request from recognition apparatus 1410 or that can push the lightened parameters to the recognition apparatus 1410. The restoration apparatus 1420 selectively performs at least one of deregularization, dequantization, or decompression based on a determined scheme applied to the lightened parameters by any of the above noted lightening apparatuses, to restore the parameters. Such a scheme may be determined by scheme information included with lightened parameters, or discerned from a format of the lightened parameters, such as whether the lightened parameters are in fixed-point format, which may suggest that dequantization should be performed, whether the aforementioned compression index information is also included with the lightened parameters, which may suggest that decompression should be performed. As another example, if the lightened parameters include any zero value parameters, and if it is determined that decompression is not desired, this may suggest that deregularization should be performed. Alternatively, if the values of the lightened parameters are limited to a value below a typical absolute value maximum original parameter value, e.g., between −1 and 1, then it may also be determined that deregularization should be performed. In an example, when regularization is applied to the lightened parameters, the restoration apparatus 1420 deregularizes the lightened parameters. In this example, the restoration apparatus 1420 performs an inverse-shift operation by increasing absolute values of the parameters by a value corresponding to a variable a, for example, through the deregularization. As noted above, the variable a may be determined by the lightening apparatus as a regularization variable for implementing a truncation operation of the original trained parameters, and thus also used in a shifting of a distribution range by the lightening apparatus of the truncated and cut off parameter values toward zero. Thus, in the deregularization, values of positive lightened parameters increase by the value of the variable a, and values of negative lightened parameters decrease by the value of the variable a. Information of the variable a may be included with the received lightened parameters.

In another example, when quantization is determined to have been applied when generating the lightened parameters, the restoration apparatus 1420 dequantizes the lightened parameters. For example, the restoration apparatus 1420 changes a representation scheme of quantized parameters to a scheme suitable for a system through the dequantization, such as when the lightened parameters are determined to be quantized for 16-bit fixed-point integers, e.g., from a 32-bit floating-point real number scheme of the original trained parameters, the restoration apparatus 1420 dequantizes the parameters to 32-bit floating-point real numbers. Depending on examples, when a fixed-point data type is used for the original plurality of layers 1411, dequantization may not be performed. In addition, though 32-bit floating-point real number schemes are described for a representation scheme for the original trained parameter values, embodiments are not limited thereto, and the original trained parameter values may be represented according to alternate schemes.

In still another example, when compression is determined to have been applied in the generating of the lightened parameters, the restoration apparatus 1420 decompresses the lightened parameters. The restoration apparatus 1420 decompresses the lightened parameters based on a non-zero sequence and a bit sequence, e.g., the aforementioned example compression index described with respect to FIG. 9, that indicates whether original trained parameters, or which regularized parameters, had a value of zero before compression by the lightening apparatus. In an example, parameters with a value of zero are generated based on the decompression, and thus the restoration apparatus 1420 may apply decompression lastly among deregularization, dequantization, and decompression to prevent resources from being unnecessarily consumed due to data processing for parameters with a value of zero.

Figure 15:
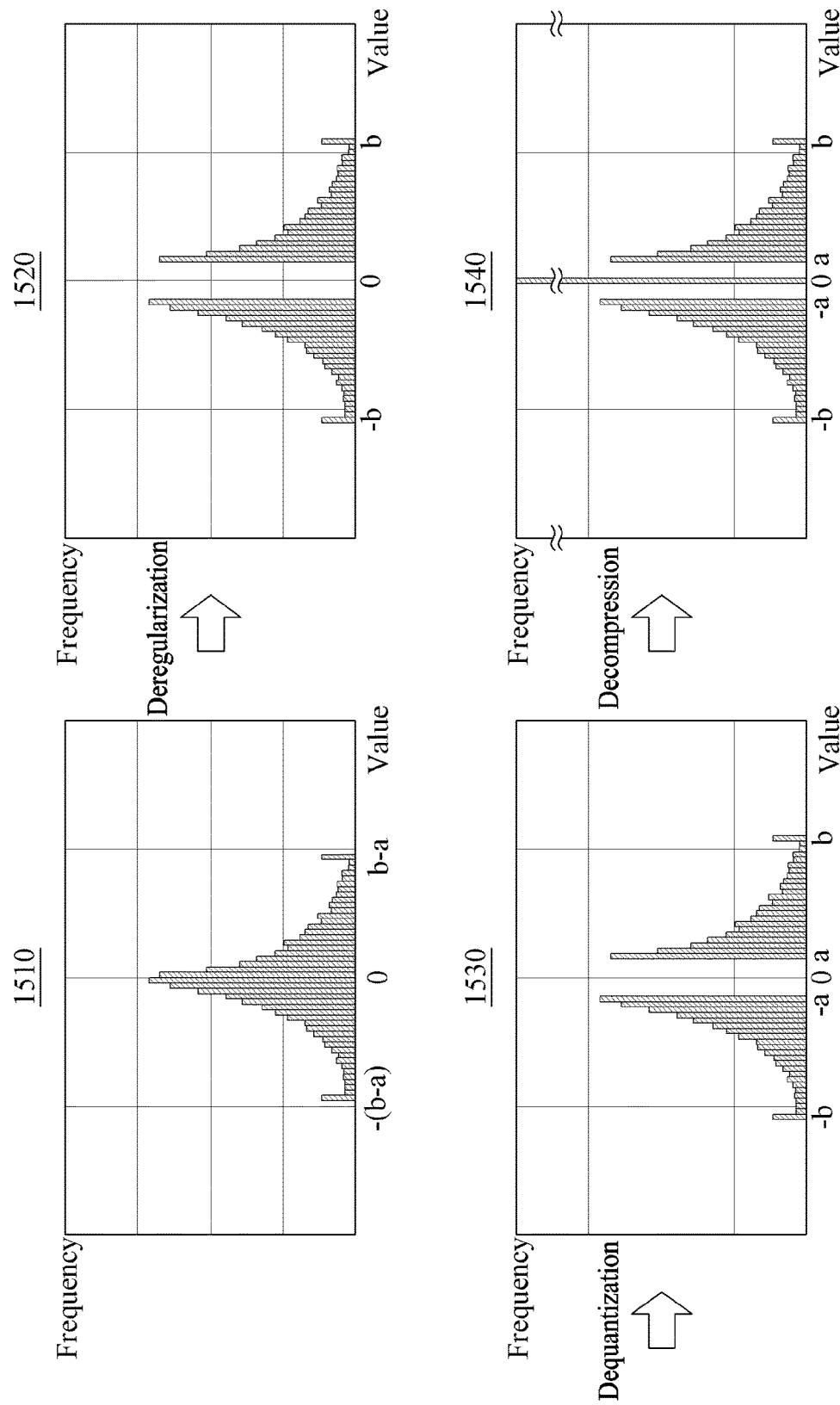
FIG. 15 illustrates an example of a change in a distribution of parameters by restoration.

FIG. 15 illustrates an example of a change in a distribution of parameters by restoration, such as through restoration of received lightened parameters by the recognition apparatus 1410 of FIG. 14. FIG. 15 illustrates a distribution 1510 of the lightened parameters, a distribution 1520 of the deregularized parameters, a distribution 1530 of the dequantized parameters, and a distribution 1540 of the decompressed parameters. In the distribution 1510, the lightened parameters are distributed in a range corresponding to "−(b−a)" to "(b−a)" as a lightweight range. In the distribution 1520, absolute values of the parameters increase by a value corresponding to the variable a based on deregularization thereby shifting the corresponding distribution range away from zero and so the shifted parameters are distributed in a range corresponding to −b to −a and a range corresponding to a to b. Since dequantization has an influence on a representation format of data, the distribution of the parameters does not change from that of distribution 1520 due to the dequantization, as shown in the distribution 1530. In the distribution 1540, a large number of parameters with a value of zero are generated through decompression.

Figure 16:
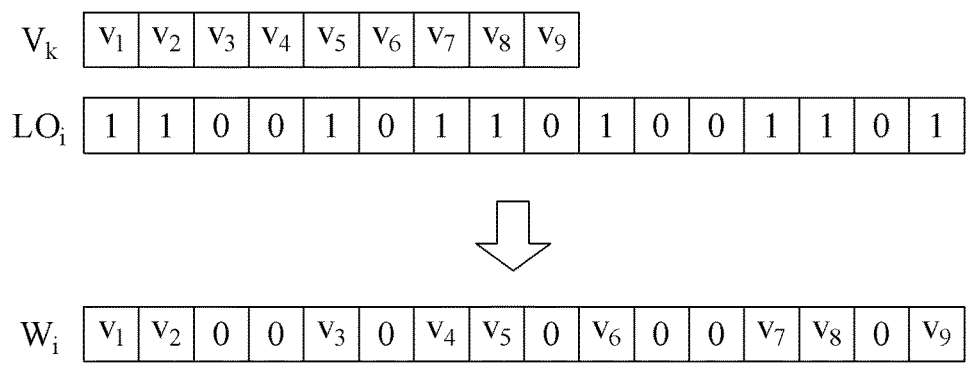
FIG. 16 illustrates an example of a change in a sequence by decompression.

FIG. 16 illustrates an example of a change in a sequence by decompression. FIG. 16 illustrates a non-zero sequence $V_k$, with non-zero parameters $v_1$-$v_9$, a bit sequence $LO_i$ and a resultant sequence $W_i$ that is obtained by the decompression, and i and k denote indices of the respective sequences. As noted above, the bit sequence $LO_i$ may be provided or obtained by the recognition or restoration apparatuses, such as along with the provided or obtained non-zero sequence $V_k$ of the lightened parameters, and based on the bit sequence $LO_i$ and non-zero sequence $V_k$ generate sequence $W_i$. For example, the restoration apparatus may simply perform decompression based on the below Table 2, as only an example.

TABLE 2

```
for(i=0, k=0; i < Len; i++)
{
    W_i = V_k * LO_i ;
    k += LO_i ;
}
```

In Table 2, Len denotes a length of the bit sequence $LO_i$. Referring to Table 2 and FIG. 16, the restoration apparatus determines a decompressed parameter $v_1$ in the sequence $W_i$ by multiplying a bit value of the index i in the bit sequence $LO_i$ and a parameter of the index k in the non-zero sequence $V_k$, and the indices i and k have a value of zero. The restoration apparatus increases the index k by a bit value "1" of the index i in the bit sequence $LO_i$. Thus, the index k increases only when a bit value in the bit sequence $LO_i$ is "1." The restoration apparatus increases the index i by "1." By repeating the above operations based on Table 2, the sequence $W_i$ is acquired. However, the decompression of FIG. 16 is merely an example, and thus other compression and decompression schemes may be used to compress and decompress lightened parameters.

Figure 17:
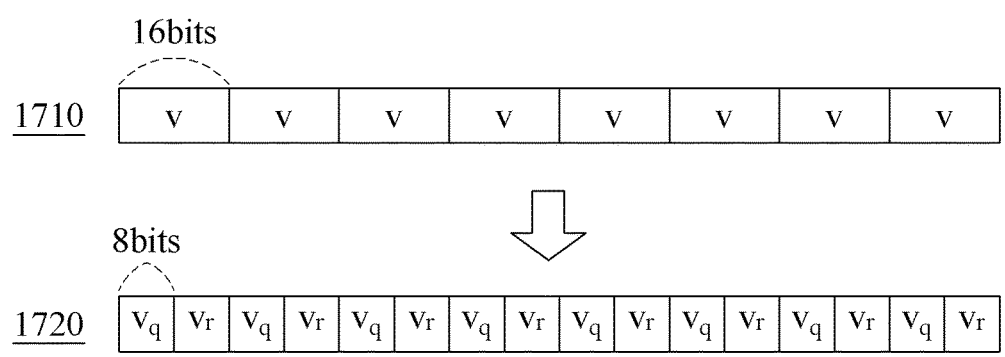
FIG. 17 illustrates an example of a change in a sequence by division.
Figure 18:
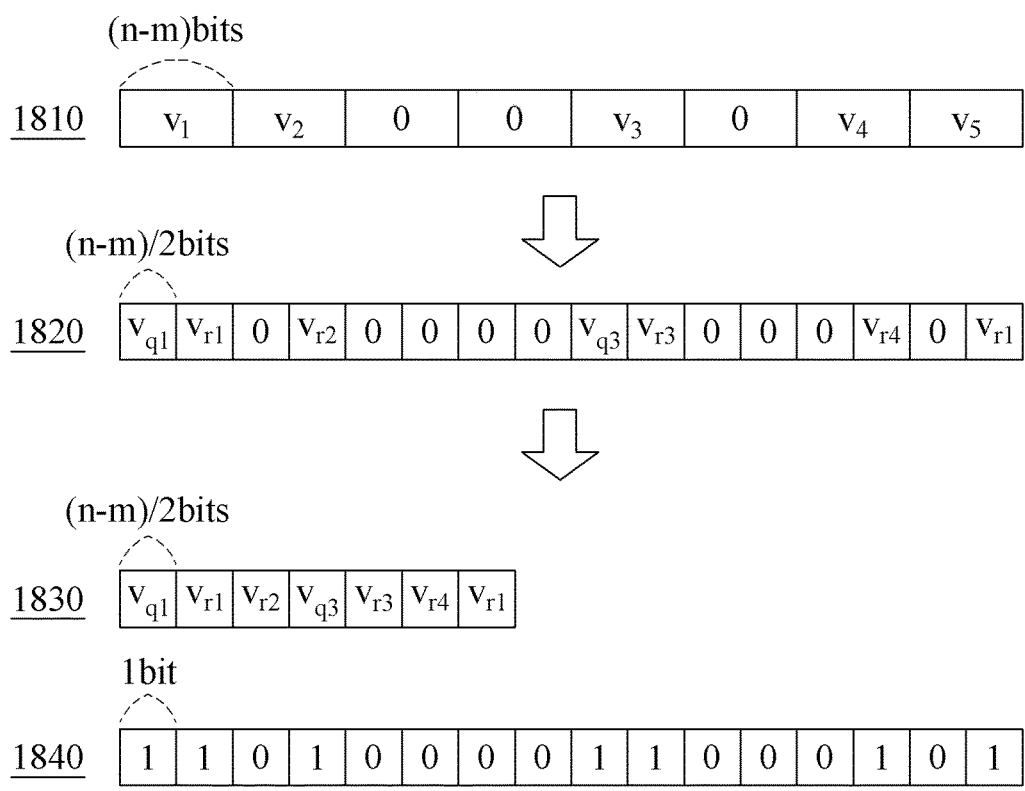
FIG. 18 illustrates an example of a change in a sequence by division and compression.

FIG. 17 illustrates an example of a change in a sequence by division, and FIG. 18 illustrates an example of a change in a sequence by division and compression. Here, FIGS. 17 and 18 demonstrate operations for reduction in bits required to store lightened parameters, or that have to be reserved for use of such lightened parameters in any subsequent lightening operations or in recognition operations based on the same.

Accordingly, FIG. 17 illustrates a sequence 1710 and a sequence 1720 obtained according to a division operation that is applied to the sequence 1710. As described above, a compression effect increases when a number of parameters with a value of zero increases in a compression process, e.g., typically the more zero value elements there are in a sequence the more the sequence can be compressed. Thus, through a division operation, the number of the parameters with the value of zero may be caused to increase. For example, the sequence 1720 can be generated by dividing a parameter v of the sequence 1710 by a preset divisor. In the sequence 1720, the sub-parameters $v_q$ correspond to respective quotients and sub-parameters $v_r$ corresponds to respective remainders of corresponding indices of sequence 1710. Referring to FIGS. 2 and 15, parameters typically have relatively small values, such as between −1 and 1 or between 0 and 1. Thus, by properly selecting a divisor for the parameters in sequence 1710, a value of zero may be obtained for the quotient for one or more of the parameters reflected in sequence 1720, and thus, the number of parameters with the value of zero may be greater in sequence 1720 than in sequence 1710. Here, though an example of one divisor being selectively used to convert sequence 1710 into sequence 1720, additional divisors may be used to selectively generate additional zero value parameters.

FIG. 18 illustrates a sequence 1810, a sequence 1820 obtained by a division operation applied to the sequence 1810, a compressed non-zero sequence 1830, and a bit sequence 1840 as a compression index of the non-zero parameters, for example, in sequence 1820. Parameters of the sequence 1810 have a size of "n−m" bits, and parameters of the sequence 1820 have a size of "(n−m)/2" bits. For example, the sequence 1810 may be a sequence of regularized parameters, e.g., as a result of any one or combination of the above lightening operations. Similar to the discussion of FIG. 17, in the example of sequence 1820, each of the regularized parameters of the sequence 1810 has been divided by a preset or determined/selected divisor of $2^{(n-m)/2}$ with a value of zero being obtained as respective quotients from the dividing of parameters $v_2$, $v_4$ and $v_5$ by the divisor of $2^{(n-m)/2}$. As the quotients of $v_2$, $v_4$ and $v_5$ because zero due to the division, this indicates that values of the parameters $v_2$, $v_4$ and $v_5$ were each less than $2^{(n-m)/2}$. Thus, as indicated in sequence 1820, resultant quotients that would have a value of zero are generated in corresponding sub-parameter indices through the division, thereby increasing the number of zero value entries.

The non-zero sequence 1830 includes only those quotient and remainder sub-parameters that have non-zero values among quotient and remainder sub-parameters in the sequence 1820. The bit sequence 1840 is a compression index sequence that indicates whether/which quotient and remainder sub-parameters, e.g., in the uncompressed sequence 1820, have a value of zero. In sequence 1810, the total number of bits is a product of a value of "(n−m)" and a total number of parameters, and thus this total number of bits would be required for storing the sequence 1810, using the sequence 1810 in subsequent operations, and for transmitting the sequence 1810. In an example, if a compression operation is applied to the sequence 1810, e.g., before the described division operation is performed to generate sequence 1820, the resulting compressed sequence would have a total number of bits corresponding to the value of "n−m" multiplied by the number of parameters of sequence 1810 with non-zero values, with compression index sequence having a total number of bits equal to the total number of parameters in the sequence 1810. Rather, in another example, if the compression is applied to the above sequence 1820 based on the division operation applied to sequence 1810, the resulting compressed sequence 1830 would have a total number of bits corresponding to the value of "(n−m)/2" multiplied the number of sub-parameters with non-zero values, with compression index sequence having a total number of bits equal to the total number of sub-parameters in the sequence 1820. Thus, the total number of bits for sequence 1830 and sequence 1840 may be less than the total number of bits for a compressed sequence of 1810 and corresponding compression index sequence, thus greater compression may be achieved with the division and the compression operation described above.

Figure 19:
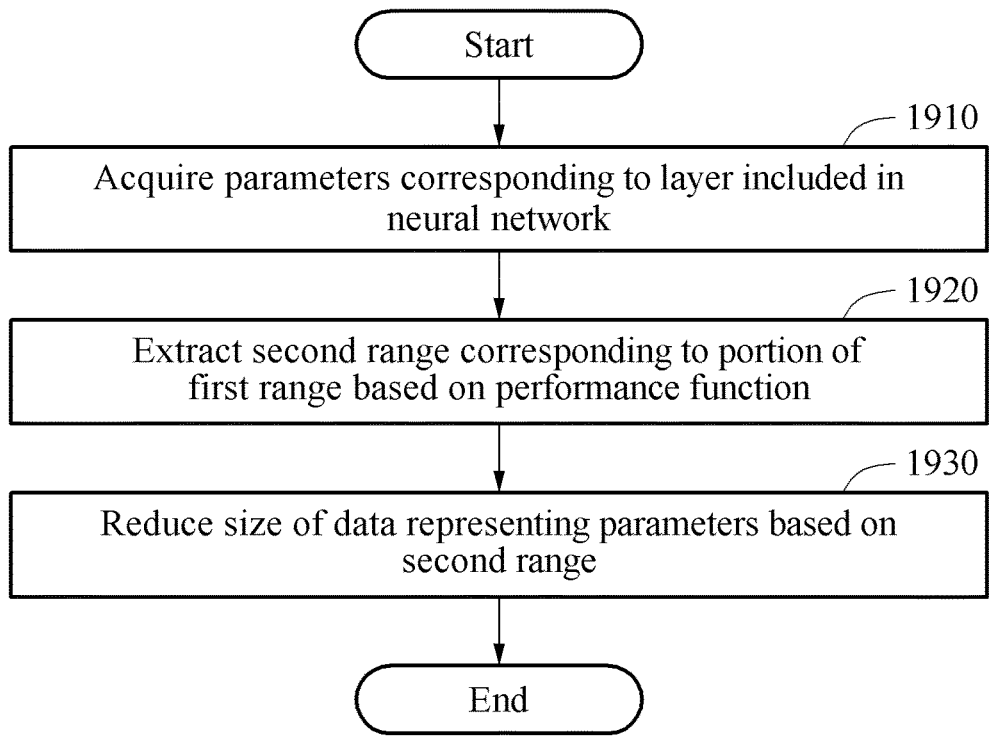
FIG. 19 is a flowchart illustrating an example of a lightening method.

FIG. 19 is a flowchart illustrating an example of a lightening method. Referring to FIG. 19, in operation 1910, a lightening apparatus acquires finally trained parameters corresponding to at least one layer for a corresponding neural network configured according to the finally trained parameters. The finally trained parameters have a distribution in an original range. In operation 1920, the lightening apparatus converts the finally trained parameters with the original range into lightened parameters with a lightweight range, corresponding to a portion of the original range, i.e., a portion less than the original range, based on a predefined performance function. In operation 1930, the lightening apparatus reduces a size of data representing parameters based on the lightweight range, such as through a shifting of a distribution of the lightweight toward zero and/or compression of the lightened parameter. The above-described operations in FIGS. 1-18 are also applicable to the lightening method, and thus further description of the lightening method is not repeated here.

Figure 20:
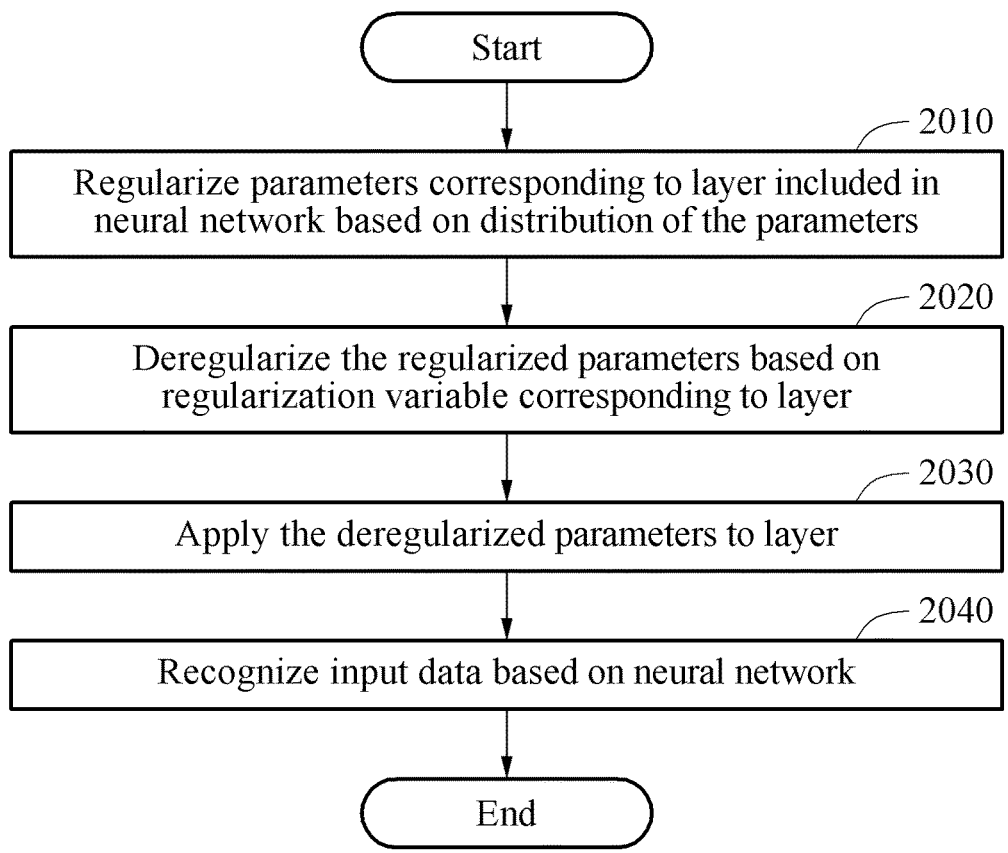
FIG. 20 is a flowchart illustrating an example of a recognition method.

FIG. 20 is a flowchart illustrating an example of a recognition method. Referring to FIG. 20, in operation 2010, a recognition apparatus acquires regularized parameters, the regularized parameters having been regularized through changes in a distribution of originally trained parameters for an original neural network according to one or more or all lightening operations discussed above with respect to FIGS. 1-19. The regularized parameters correspond to at least one layer for a neural network. In operation 2020, the recognition apparatus deregularizes the regularized parameters based on a regularization variable corresponding to the layer. In operation 2030, the recognition apparatus applies the deregularized parameters to a corresponding layer of the neural network. Here, operation 2030 may further include generating the corresponding layer of the neural network. Operation 2030 may still further include generating the neural network with all layers specially configured according to the deregularized parameters. Alternatively, operation 2030 may include generating plural layers of the neural network specially configured according to the deregularized parameters and generating the neural network by combining the generated plural layers with previously generated layers specially generated based on some of the originally trained parameters. Operations may include previously generating all layers of the original neural network configured according to the originally trained parameters, and using the deregularized parameters to change the configuration of select layers of the original neural network to generate a new lightened neural network. In operation 2040, the recognition apparatus uses the neural network based on the deregularized parameters to recognize input data. The above-described operations are applicable to the recognition method, and thus further description of the recognition method is not repeated here.

Figure 21:
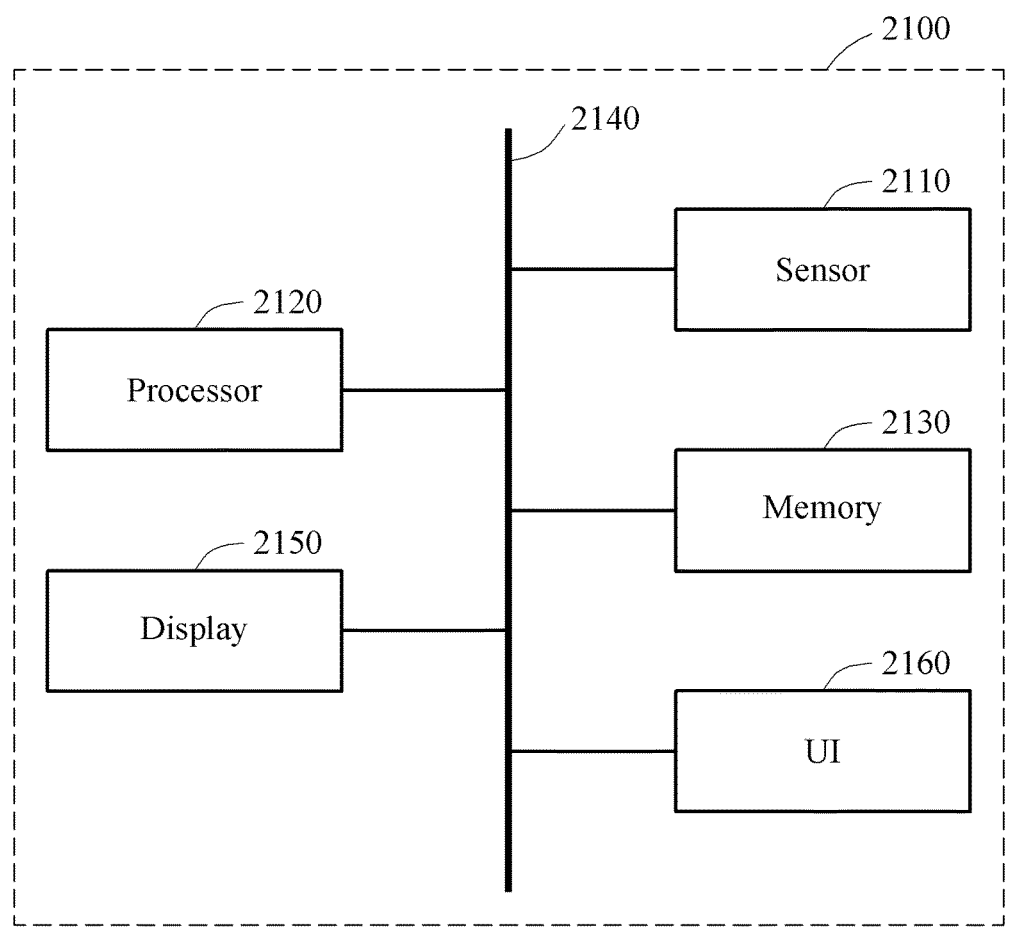
FIG. 21 illustrates an example of an electronic system configured to implement a lightening operation according to one or more embodiments.

FIG. 21 illustrates an example of an electronic system or device 2100. Referring to FIG. 21, the electronic system or device 2100 includes a sensor 2110, a processor 2120, a memory 2130, a display 2150, and a user interface (UI) 2160. The sensor 2110, the processor, 2120, the memory 2130, the display 2150, and the UI 2160 communicate with each other via a bus 240. Any of the above lightening apparatuses, the restoration apparatuses, the training apparatuses, and the recognition apparatuses that have been described above are implemented as, for example, at least one portion of the electronic system or device 2100. For example, the processor 2120 may represent one or more processors that are configured as any or any combination of the above lightening apparatuses, the restoration apparatuses, the tuning apparatuses, the training apparatuses, and the recognition apparatuses, or one or more of the lightening apparatuses, the restoration apparatuses, the tuning apparatuses, the training apparatuses, and the recognition apparatuses may be separate components in the electronic system or device 2100 and communicate to each other through the bus 240.

The sensor 2110 includes, for example, a microphone and/or an image sensor or camera to sense video data and audio data to recognize an object. The sensor 2110 senses an image using a well-known scheme, for example, a scheme of converting an optical image to an electronic signal. An output of the sensor 2110 is transferred to the processor 2120 or the memory 2130.

The processor 2120 corresponds to one or more of the lightening apparatuses, the restoration apparatuses, the tuning apparatuses, the training apparatuses, and the recognition apparatuses, or the processor(s) included therein, described with reference to FIGS. 1 through 20, and may be configured to perform one or more or all processes described with reference to FIGS. 1 through 20. For example, to perform lightening, the processor 2120 may be configured to acquire finally trained parameters that correspond to at least one layer for a neural network, with the parameters having an original range distribution, convert the parameters with the original range into lightened parameters with a lightweight range corresponding to a portion of the original range based on a predefined performance function, and reduce a size of data representing the converted parameters. Also, to recognize an object, the processor 2120 may be configured to acquire such regularized parameters that have a lightweight range distribution, deregularize the regularized parameters based on a regularization variable corresponding to a corresponding layer, for example, to have a greater range distribution, apply the deregularized parameters to the layer to generate a lightened neural network, and recognize input data based on the lightened neural network. The result of the recognition may be output through the display 2150. In addition, user adjustments of operations of the lightening operations discussed herein may be provided by UI 2160, which may include a touch screen or other input device/system. In an example, the processor 2120 may be a graphics processor unit (GPU), reconfigurable processor, or have any other type of multi- or single-processor configuration.

The memory 2130 is a non-transitory medium and stores the regularization variable, the performance function, a performance index, and such lightened or regularized parameters that are described above. Also, the memory 2130 may also store computer readable instructions, which when executed by processor 2120, cause the processor 2120 to implement above-described operations. The memory 2130 is, for example, a volatile memory and a nonvolatile memory, and may also correspond to any memory otherwise discussed above with respect to FIGS. 1-20.

The memory 2130 may further store instructions which, when executed by processor 2120, cause the processor 2120 to perform additional operations, functions, and controls of the electronic system or device 2100, such as a user interface of the electronic system. The electronic system or device 2100 may be connected to an external device, for example, a personal computer (PC) or a network, via an input/output device of the electronic system, to exchange data with the external device. The electronic system or device 2100 may be various electronic devices, as only non-limiting examples, a mobile device, for example, a mobile telephone, a smartphone, a personal digital assistant (PDA), a tablet computer or a laptop computer, a computing device, for example, a PC, a tablet computer or a netbook computer, an electronic product, for example, a television (TV), a smart TV, or a security device for gate control. In an example, a user may train a model in a user device corresponding to the electronic system or device 2100, for example, a mobile device, by lightening parameters for an original neural network, using such lightened parameters to change an existing neural network to a lightened neural network, and using the lightened neural network, as only examples.

The lightening apparatuses, the restoration apparatuses, the tuning apparatuses, the training apparatuses, the recognition apparatuses, processors, memories, lightening apparatus 100, verification DB, training apparatus 1110, training DB 1111, parameter adjuster 1112, model layers 1113, lightening apparatus 1120, storage 1130, training apparatus 1210, parameter tuning apparatus 1220, training DB 1221, model layers 1222, lightening apparatus 1230, storage 1240, training apparatus 1310, training DB 1311, model layers 1312, lightening apparatus 1320, storage 1330, recognition apparatus 1410, model layers 1411, recognizer 1412, restoration apparatus 1420, electronic system or device 2100, bus 2140, processor 2120, sensor 2110, memory 2130, display 2150, and user interface 2160, for example, in FIGS. 1-21 and that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIG. 1-21 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A neural network apparatus comprising:
a processor configured to generate a neural network with a plurality of layers comprising plural nodes by applying lightened weighted connections between neighboring nodes in neighboring layers of the neural network to interpret input data applied to the neural network,
wherein lightened weighted connections of at least one of the plurality of layers includes weighted connections that have values equal to zero for respective non-zero values whose absolute values are less than an absolute value of a first non-zero value,
wherein the first non-zero value is derived by iteratively adjusting the first non-zero value until either a recognition rate according to the lightened weighted connections is less than a target criterion, or an error rate according to the lightened weighted connections is greater than or equal to, the target criterion, and
wherein the processor is further configured to acquire regularized parameters, as the lightened weighted connections of the at least one layer, perform a deregularization of the regularized parameters based on a determined regularization variable, as the first non-zero value, corresponding to the at least one layer of the neural network, and determined dependent on an inference result of the neural network, and
wherein the deregularization adjusts a distribution of the regularized parameters by shifting the regularized parameters using the determined regularization variable.

2. The neural network apparatus of claim 1, wherein the lightened weighted connections of the at least one layer are lightened weighted connections resulting from a lightening of trained final weighted connections of a corresponding at least one layer, of a trained neural network, that include weighted connections that have at least some non-zero values for respective values less than a positive variant of the first non-zero value and/or for respective values greater than a negative variant of the first non-zero value, the generated neural network representing a lightened neural network corresponding to the trained neural network trained for the interpreting of input data.

3. The neural network apparatus of claim 2, wherein the processor is further configured to obtain the trained final weighted connections and generate the neural network with the lightened weighted connections by performing the lightening of the obtained trained final weighted connections of the corresponding at least one layer by setting to zero at least some of the trained final weighted connections, of the corresponding at least one layer, whose values are less than a positive variant of the first non-zero value and/or greater than a negative variant of the first non-zero value.

4. The neural network apparatus of claim 2, wherein the processor is further configured to generate the neural network by applying the deregularized parameters to generate the at least one layer of the neural network, and perform a recognition operation of input data by applying the input data to the generated neural network.

5. The neural network apparatus of claim 2, wherein the trained final weighted connections have values in a 32-bit floating-point representation format and the lightened weighted connections have values in a 16-bit fixed-point representation format.

6. The neural network apparatus of claim 1, wherein the lightened weighted connections of the at least one layer, or other lightened weighted connections of the at least one layer, include weighted connections that have values whose absolute values are not greater than an absolute value of an absolute value of a different second non-zero value.

7. The neural network apparatus of claim 6, wherein the different non-zero value is different between at least two of the plurality of layers having lightened weighted connections.

8. The neural network apparatus of claim 6, wherein the different non-zero value is different between at least two output map channels for a convolutional layer of the generated neural network having the lightened weighted connections.

9. The neural network apparatus of claim 6, wherein the lightened weighted connections have values that are respectively represented by a number of bits corresponding to $\log_2(b-a)$ in which b denotes an integer absolute value of the different non-zero value and a corresponds to an integer absolute value of the first non-zero value.

10. The neural network apparatus of claim 1, wherein the first non-zero value is different between at least two of the plurality of layers having lightened weighted connections.

11. The neural network apparatus of claim 1, wherein the first non-zero value is different between at least two output map channels for a convolutional layer of the generated neural network having the lightened weighted connections.

12. The neural network apparatus of claim 1, wherein the lightened weighted connections have values respectively represented by a number of bits corresponding to $\log_2(\max-a)$ in which max denotes a maximum non-zero positive integer value of the lightened weighted connections and a denotes an integer absolute value of the first non-zero value.

13. A neural network apparatus comprising:
a processor configured to generate a neural network with a plurality of layers comprising plural nodes by applying lightened weighted connections between neighboring nodes in neighboring layers of the neural network to interpret input data applied to the neural network,
wherein lightened weighted connections of at least one of the plurality of layers includes weighted connections that have values whose absolute values are no greater than an absolute value of a first non-zero value, and
wherein the lightened weighted connections are lightened weighted connections of trained final weighted connections, of a trained neural network trained for the interpreting of the input data, that have values whose maximum absolute value is greater than the absolute value of the first non-zero value,
wherein the first non-zero value is derived by iteratively adjusting the first non-zero value until either a recognition rate according to the lightened weighted connections is less than a target criterion, or an error rate according to the lightened weighted connections is greater than or equal to, the target criterion, and
wherein the processor is further configured to acquire regularized parameters, as the lightened weighted connections of the at least one layer, perform a deregularization of the regularized parameters based on a determined regularization variable, as the first non-zero value, corresponding to the at least one layer of the neural network, and determined dependent on an inference result of the neural network, and wherein the deregularization adjusts a distribution of the regularized parameters by shifting the regularized parameters using the determined regularization variable.

14. The neural network apparatus of claim 13, wherein the processor is further configured to obtain the trained final weighted connections and generate the neural network with the lightened weighted connections by performing lightening of the obtained trained final weighted connections by setting at least some of the trained final weighted connections whose values are greater than a positive variant of the first non-zero value to the positive variant of the first non-zero value and/or by setting at least some other of the trained final weighted connections whose values are less than a negative variant of the first non-zero value to the negative variant of the first non-zero value.

15. The neural network apparatus of claim 13, wherein the processor is further configured to perform training to generate the trained neural network by generating the trained final weighted connections of the trained neural network by repeatedly applying labeled input training data to neural network variants with respectively adjusted weighted connections to perform interpretation of the input training data until the trained neural network is determined, with the training to generate the trained neural network including nodes of the neural network variants applying an activation function that limits positive and negative node output values to the maximum absolute value.

16. The neural network apparatus of claim 13, wherein the first non-zero value is different between at least two of the plurality of layers of the generated neural network having lightened weighted connections.

17. The neural network apparatus of claim 13, wherein the first non-zero value is different between at least two output map channels for a convolutional layer of the generated neural network having lightened weighted connections.

18. The neural network apparatus of claim 13, wherein the lightened weighted connections have values respectively represented by a number of bits corresponding to $\log_2(b-a)$ in which b denotes an integer absolute value of the first non-zero value and a denotes to an integer absolute value of a different non-zero value corresponding to a truncation of weighted connection values in the lightened weighted connections.

19. A processor implemented recognition method comprising:
acquiring regularized parameters corresponding to at least one layer of a lightened neural network, the regularized parameters being regularized parameters derived from trained final parameters of another neural network and including at least some different parameter values from the trained final parameters of the other neural network;
performing a de-regularizing of the regularized parameters based on a determined regularization variable corresponding to the at least one layer of the neural network and determined dependent on an inference result of the neural network;
generating the neural network by applying the de-regularized parameters to generate the at least one layer of the neural network; and
performing a recognition operation of input data by applying the input data to the generated neural network,
wherein the de-regularizing adjusts a distribution of the regularized parameters by shifting the regularized parameters using the determined regularization variable.

20. The recognition method of claim 19, further comprising acquiring the trained final parameters of the other neural network, wherein the generating of the neural network includes generating at least one other layer of the neural network using at least some of the acquired trained final parameters.

21. The recognition method of claim 19, further comprising
performing another de-regularizing of the regularized parameters based on a determined different regularization variable corresponding to another at least one layer of the neural network or corresponding to an output map channel of a layer of the at least one layer of the neural network that is different from the determined regularization variable that corresponds to another output map channel of the layer of the at least one layer of the neural network.

22. The recognition method of claim 19, wherein the regularization variable comprises an offset representing a shift in the regularized parameters based on a value of zero.

23. The recognition method of claim 19, wherein the generating of the neural network includes, in response to the de-regularized parameters being determined to correspond to m-bit integers and the input data being n-bit real numbers and with n being greater than m, dequantizing the de-regularized parameters to the n-bit real numbers and generating the neural network by applying the dequantized parameters to generate the at least one layer of the neural network.

24. The recognition method of claim 19, wherein the generating of the neural network includes:
determining whether the acquired regularized parameters are compressed regularized parameters, and in response to the determination indicating that the acquired regularized parameters are compressed regularized parameters acquiring a bit sequence indicating which parameters corresponding to the at least one layer were removed during compression for the compressed regularized parameters, decompressing the de-regularized parameters based on the bit sequence, and applying the decompressed de-regularized parameters to generate the at least one layer.

25. The recognition method of claim 24, wherein the decompressing of the de-regularized parameters comprises:
determining a decompressed parameter of a first index in the bit sequence by multiplying a bit value of the first index and a parameter of a second index in a sequence of the de-regularized parameters;
increasing the second index by the bit value of the first index; and
increasing the first index by "1."

26. A non-transitory computer-readable storage medium storing instructions, which when executed by a processor, cause the processor to perform the method of claim 19.

27. A recognition apparatus comprising:
a processor configured to acquire regularized parameters corresponding to at least one layer of a lightened neural network, perform a de-regularization of the regularized parameters based on a determined regularization variable corresponding to the at least one layer of the neural network and determined dependent on an inference result of the neural network, generate the neural network by applying the de-regularized parameters to generate the at least one layer of the neural network, and perform a recognition operation of input data by applying the input data to the generated neural network, wherein the regularized parameters are regularized parameters derived from trained final parameters of another neural network and include at least some different parameter values from the trained final parameters of the other neural network, and wherein the de-regularization adjusts a distribution of the regularized parameters by shifting the regularized parameters using the determined regularization variable.

28. The recognition apparatus of claim 27, further comprising a camera configured to capture an image as the input data.

29. The recognition apparatus of claim 27, wherein the processor is further configured to acquire the trained final parameters of the other neural network, and, to generate the neural network, the processor is further configured to generate at least one other layer of the neural network using the acquired trained final parameters.

30. The recognition apparatus of claim 27, further comprising a memory, the memory storing the trained final parameters, wherein the processor is further configured to apply the trained final parameters to generate the other neural network, and to apply the de-regularized parameters to at least one layer of the generated other neural network to generate the neural network.

31. The recognition apparatus of claim 27, wherein the processor is further configured to perform another de-regularizing of the regularized parameters based on a determined different regularization variable corresponding to another at least one layer of the neural network or corresponding to an output map channel of a layer of the at least one layer of the neural network that is different from the determined regularization variable that corresponds to another output map channel of the layer of the at least one layer of the neural network.

32. The recognition apparatus of claim 27, wherein the regularization variable comprises an offset representing a shift in the regularized parameters based on a value of zero.

33. The recognition apparatus of claim 27, wherein the generating of the neural network by the processor includes, in response to the de-regularized parameters being determined to correspond to m-bit integers and the input data being n-bit real numbers and with n being greater than m, dequantizing the de-regularized parameters to the n-bit real numbers and generating the neural network by applying the dequantized parameters to generate the at least one layer of the neural network.

34. The recognition apparatus of claim 27, wherein the processor is further configured to determine whether the acquired regularized parameters are compressed regularized parameters, and in response to the determination indicating that the acquired regularized parameters are compressed regularized parameters acquiring a bit sequence indicating which parameters corresponding to the at least one layer were removed during compression for the compressed regularized parameters, decompressing the de-regularized parameters based on the bit sequence, and applying the decompressed de-regularized parameters to generate the at least one layer.

35. The recognition apparatus of claim 34, wherein the processor is further configured to determine a decompressed parameter of a first index in the bit sequence by multiplying a bit value of the first index and a parameter of a second index in a sequence of the de-regularized parameters, increase the second index by the bit value of the first index, and increase the first index by "1," to decompress the de-regularized parameters.

36. The recognition method of claim 19, wherein the determined regularization variable is derived by iteratively adjusting the determined regularization variable until a performance index of the regularized parameters satisfies a target criterion, the performance index comprising at least one of a recognition rate and an error rate according to the regularized parameters.

37. The recognition apparatus of claim 27, wherein the determined regularization variable is derived by iteratively adjusting the determined regularization variable until a performance index of the regularized parameters satisfies a target criterion, the performance index comprising at least one of a recognition rate and an error rate according to the regularized parameters.

* * * * *